(12) United States Patent
Hyodo et al.

(10) Patent No.: US 10,895,062 B2
(45) Date of Patent: Jan. 19, 2021

(54) LOADING VEHICLE

(71) Applicant: HITACHI CONSTRUCTION MACHINERY CO., LTD., Tokyo (JP)

(72) Inventors: Koji Hyodo, Kasumigaura (JP); Yuki Ahiko, Abiko (JP); Tetsuji Tanaka, Abiko (JP); Isamu Aoki, Tsukuba (JP); Masaki Nukii, Ushiku (JP); Masashi Yamashita, Ushiku (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 16/641,718

(22) PCT Filed: Sep. 28, 2018

(86) PCT No.: PCT/JP2018/036235
§ 371 (c)(1),
(2) Date: Feb. 25, 2020

(87) PCT Pub. No.: WO2020/065913
PCT Pub. Date: Apr. 2, 2020

(65) Prior Publication Data
US 2020/0378089 A1 Dec. 3, 2020

(51) Int. Cl.
*E02F 9/22* (2006.01)
*E02F 3/43* (2006.01)
(Continued)

(52) U.S. Cl.
CPC .......... *E02F 9/2253* (2013.01); *B60W 10/06* (2013.01); *B60W 10/103* (2013.01); *E02F 3/43* (2013.01);
(Continued)

(58) Field of Classification Search
CPC ..... E02F 9/2253; E02F 9/2246; E02F 9/2296; E02F 3/43; B60W 10/06; B60W 10/103; B60W 2300/17; F02D 29/00
See application file for complete search history.

(56) References Cited

U.S. PATENT DOCUMENTS 9,140,356 B2 * 9/2015 Kamada .................. F16H 61/42
9,631,344 B1 * 4/2017 Nishimura ............. E02F 9/2253
(Continued)

FOREIGN PATENT DOCUMENTS

EP          2123533 A2 * 11/2009 .......... F16H 61/465
JP    2014-013056 A       1/2014
(Continued)

*Primary Examiner* — David R Morris
(74) *Attorney, Agent, or Firm* — Mattingly & Malur, PC

(57) ABSTRACT

Provide is a loading vehicle capable of quickly operating an object handling device in the upward direction while traveling forward.
A wheel loader 1 comprises an engine 3, an HST pump 41, an HST motor 42, a forward/reverse changeover switch 62, a step-on amount sensor 610, a pressure sensor 73, and a controller 5. In a case where a specific condition for specifying lifting operation of a lift arm 21 during forward traveling of the vehicle body is satisfied, the controller 5 increases maximum rotational speed of the engine to a predetermined value Nmax2 which is greater than maximum engine rotational speed Nmax1 during traveling on the flat ground, and limit maximum vehicle speed to a predetermined value Vmax2 which is smaller than maximum vehicle speed Vmax1 prior to the lifting operation of the lift arm 2.

6 Claims, 17 Drawing Sheets

(51) Int. Cl.
*B60W 10/06* (2006.01)
*B60W 10/103* (2012.01)
*F02D 29/00* (2006.01)

(52) U.S. Cl.
CPC .......... *E02F 9/2246* (2013.01); *E02F 9/2296* (2013.01); *F02D 29/00* (2013.01)

(56) References Cited

U.S. PATENT DOCUMENTS

| | | | |
|---|---|---|---|
| 9,677,572 B2* | 6/2017 | Knussman | F15B 1/024 |
| 2014/0012472 A1* | 1/2014 | Kamada | F16H 61/421 |
| | | | 701/60 |
| 2016/0108933 A1 | 4/2016 | Knussman et al. | |
| 2016/0326720 A1* | 11/2016 | Uno | E02F 3/431 |
| 2017/0101763 A1* | 4/2017 | Nishimura | B60W 10/103 |
| 2019/0352881 A1* | 11/2019 | Oasa | B60W 10/06 |

FOREIGN PATENT DOCUMENTS

| | | |
|---|---|---|
| JP | 2015-036495 A | 2/2015 |
| JP | 2015-094070 A | 5/2015 |
| JP | 2018-053539 A | 4/2018 |
| WO | 2015/093477 A1 | 6/2015 |
| WO | 2016/043348 A1 | 3/2016 |

\* cited by examiner

FIG. 11
(a)
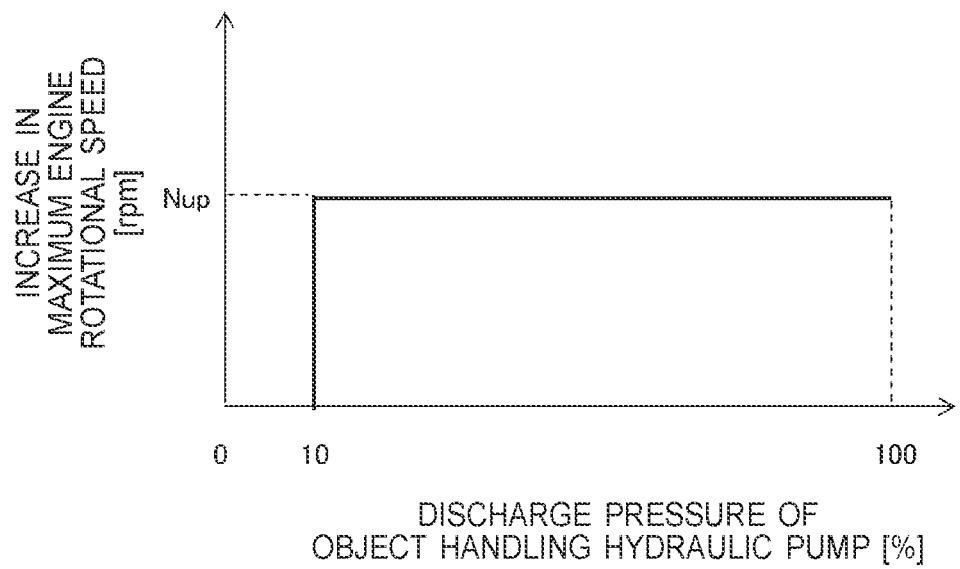
(b)
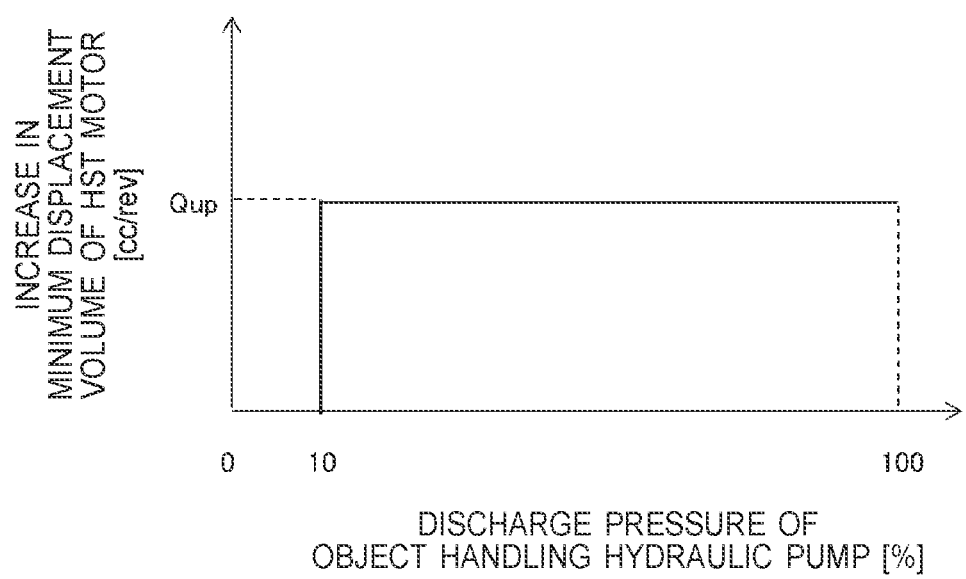

LOADING VEHICLE

TECHNICAL FIELD

The present invention relates to a loading vehicle equipped with a traveling drive system which employs a continuously variable transmission.

BACKGROUND ART

As a traveling drive system employing a continuously variable transmission, which is mounted on a loading vehicle equipped with an object handling device such as a wheel loader and a forklift, for example, an HST (Hydraulic Static Transmission) or an HMT (Hydraulic Mechanical Transmission), and an EMT (Electronically Mechanical Transmission) have been known. In the HST and HMT, a hydraulic pump is driven by an engine to generate hydraulic pressure, and the generated hydraulic pressure is converted into rotational force by a hydraulic motor. In the EMT, a generator is driven by an engine to generate electric power, and the generated electric power is converted into rotational force by an electric motor.

For example, Patent Literature 1 discloses a wheel loader comprising an engine, a hydraulic pump driven by the engine, an object handling device driven by hydraulic oil discharged from the hydraulic pump, a device operation member for operating the object handling device, a traveling device driven by the engine, a power transmission device for transmitting driving force from the engine to the traveling device, and a control unit for controlling the engine and the power transmission device.

According to the wheel loader above of Patent Literature 1, the control unit is configured to increase the rotational speed of the engine as an operation amount of the device operation member increases, and control output torque of a motor of the power transmission device to limit the traction force of the vehicle. With this configuration, the speed of the object handling device is increased while increase in the speed of the vehicle is suppressed.

CITATION LIST

Patent Literature

[Patent Literature 1] WO2015/093477

SUMMARY OF INVENTION

Technical Problem

During loading work of the wheel loader, it is necessary to move the object handling device in the upward direction while making the wheel loader travel forward within a limited distance to a dump truck. However, since the wheel loader above of Patent Literature 1 is configured to control the rotational speed of the engine in accordance with the operation amount of the device operation member so as to gradually increase the speed of the object handling device, it is difficult to quickly operate the object handling device. With this configuration, lifting operation of the object handling device takes time, and thus it is necessary to lengthen the distance from the wheel loader to the dump truck, which makes the work cycle time long and lowers the work efficiency.

It is therefore an objective of the present invention to provide a loading vehicle capable of quickly operating an object handling device in the upward direction while traveling forward.

Solution to Problem

In order to achieve the objective described above, a loading vehicle according to the present invention is configured to comprise: an engine; a variable displacement traveling hydraulic pump driven by the engine; a variable displacement traveling hydraulic motor connected to the traveling hydraulic pump through a closed circuit to transmit driving force of the engine to wheels; an object handling device provided at a front portion of a vehicle body to be rotatable in a vertical direction; an object handling hydraulic pump driven by the engine to supply hydraulic oil to the object handling device; and an operation device for operating the object handling device, wherein the loading vehicle further comprises: a traveling state sensor configured to detect a traveling state of the vehicle body; an operation state sensor configured to detect an operation state of the object handling device by the operation device; and a controller configured to control the engine, the traveling hydraulic pump, and the traveling hydraulic motor, and the controller is configured to: based on the traveling state detected by the traveling state sensor and the operation state of the object handling device detected by the operation state sensor, determine whether a specific condition for specifying lifting operation of the object handling device during forward traveling of the vehicle body is satisfied, and in a case of having determined that the specific condition is satisfied, increase maximum rotational speed of the engine to a predetermined value which is greater than the maximum rotational speed of the engine during traveling of the vehicle body on a flat ground with the object handling device being in a non-operating state, and adjust displacement volume of the traveling hydraulic pump or displacement volume of the traveling hydraulic motor so as to limit maximum vehicle speed of the vehicle body to a predetermined value which is smaller than the maximum vehicle speed of the vehicle body prior to the lifting operation of the object handling device.

Advantageous Effects of Invention

According to the loading vehicle of the present invention, it is possible to quickly operate the object handling device in the upward direction while traveling forward. The problems, configurations, and effects other than those described above will be clarified by explanation of the embodiments below.

BRIEF DESCRIPTION OF DRAWINGS

FIG. 6(b) illustrates a graph showing relationship between engine rotational speed and input torque of an HST pump, and FIG. 6(c) illustrates a graph showing relationship between engine rotational speed and discharge flow rate of an HST pump.

FIG. 11(a) illustrates a graph showing relationship between discharge pressure of an object handling hydraulic pump and increase in maximum engine rotational speed, and FIG. 11(b) illustrates a graph showing relationship between discharge pressure of an object handling hydraulic pump and increase in minimum displacement volume of an HST motor.

DESCRIPTION OF EMBODIMENTS

Hereinafter, as one aspect of a loading vehicle according to each embodiment of the present invention, a wheel loader will be described. Firstly, the entire configuration and operation of the wheel loader according to each embodiment of the present invention will be described with reference to FIGS. 1 to 3.

Figure 1:
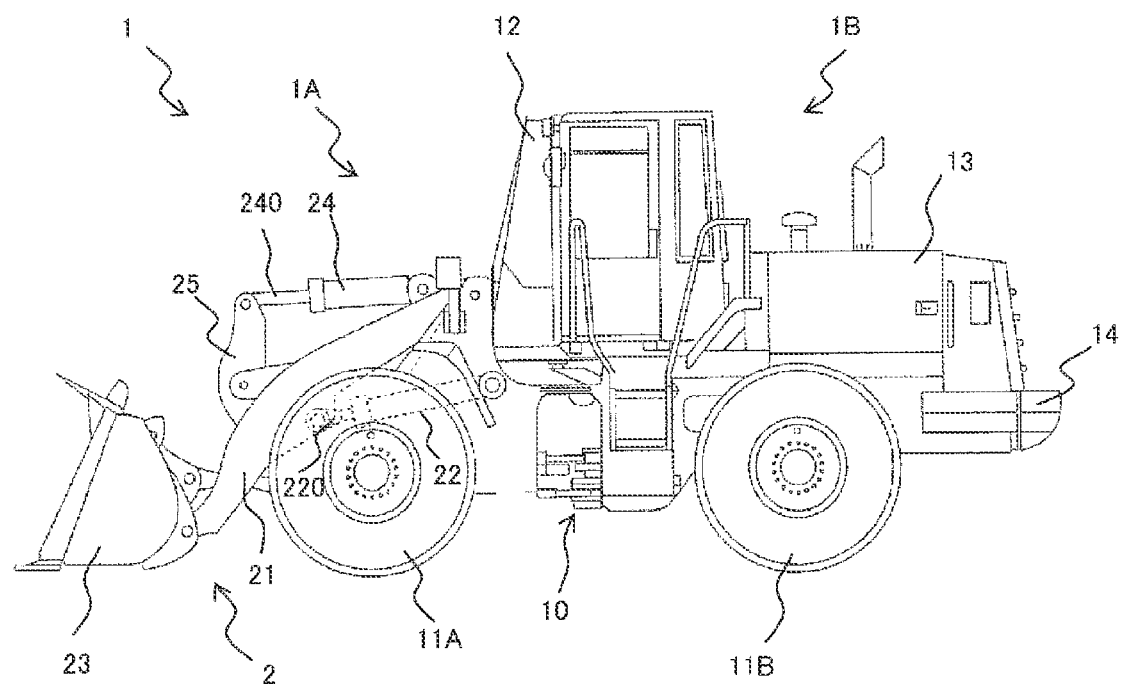
FIG. 1 is a side view illustrating appearance of a wheel loader according to each embodiment of the present invention.

FIG. 1 is a side view illustrating appearance of a wheel loader 1 according to each embodiment of the present invention.

The wheel loader 1 includes a vehicle body constituted by a front frame 1A and a rear frame 1B, and an object handling device 2 provided at a front portion of the vehicle body. The wheel loader 1 is an articulated type work vehicle which is swiveled on a central portion of the vehicle body and steered thereby. The front frame 1A and the rear frame 1B are connected to each other by a center joint 10 to swivel in the left and right direction so that the front frame 1A is bent in the left and right direction with respect to the rear frame 1B.

The front frame 1A is provided with a pair of left and right front wheels 11A, and the rear frame 1B is provided with a pair of left and right rear wheels 11B. FIG. 1 illustrates only the left front wheel 11A and the left rear wheel 11B among the pair of left and right front wheels 11A and rear wheels 11B.

Furthermore, the rear frame 1B is provided with an operator's cab 12 in which an operator works, a mechanical room 13 in which devices such as an engine, a controller, a hydraulic pump, etc. are accommodated, and a counterweight 14 for maintaining balance between the vehicle body and the object handling device 2 to prevent the vehicle body from tilting.

The object handling device 2 includes a lift arm 21 attached to the front frame 1A, a pair of lift arm cylinders 22 configured to expand and contract to rotate the lift arm 21 in the vertical direction with respect to the front frame 1A, a bucket 23 attached to the front end portion of the lift arm 21, a bucket cylinder 24 configured to expand and contract to rotate the bucket 23 in the vertical direction with respect to the lift arm 21, a bell crank 25 that is rotatably connected to the lift arm 21 and constitutes a link mechanism between the bucket 23 and the bucket cylinder 24, and a plurality of pipes (not illustrated) for guiding pressure oil to the pair of lift arm cylinders 22 and the bucket cylinder 24. FIG. 1 illustrates only one of the pair of lift arm cylinders 22, which is disposed on the left side, by indicating it with a broken line.

The lift arm 21 is rotated in the upward direction by expansion of a rod 220 of each of the lift arm cylinders 22, and rotated in the downward direction by contraction of each rod 220. The bucket 23 is tilted (rotated in the upward direction with respect to the lift arm 21) by expansion of a rod 240 of the bucket cylinder 24, and dumped (rotated in the downward direction with respect to the lift arm 21) by contraction of the rod 240.

The wheel loader 1 is a loading vehicle which is used, for example in a strip mine, to excavate earth and sand, minerals, etc. and perform object handling for loading them onto such as a dump truck. In the following, V-shape loading, which is one of the methods used when the wheel loader 1 performs excavation work and loading work, will be described with reference to FIGS. 2 and 3.

Figure 2:
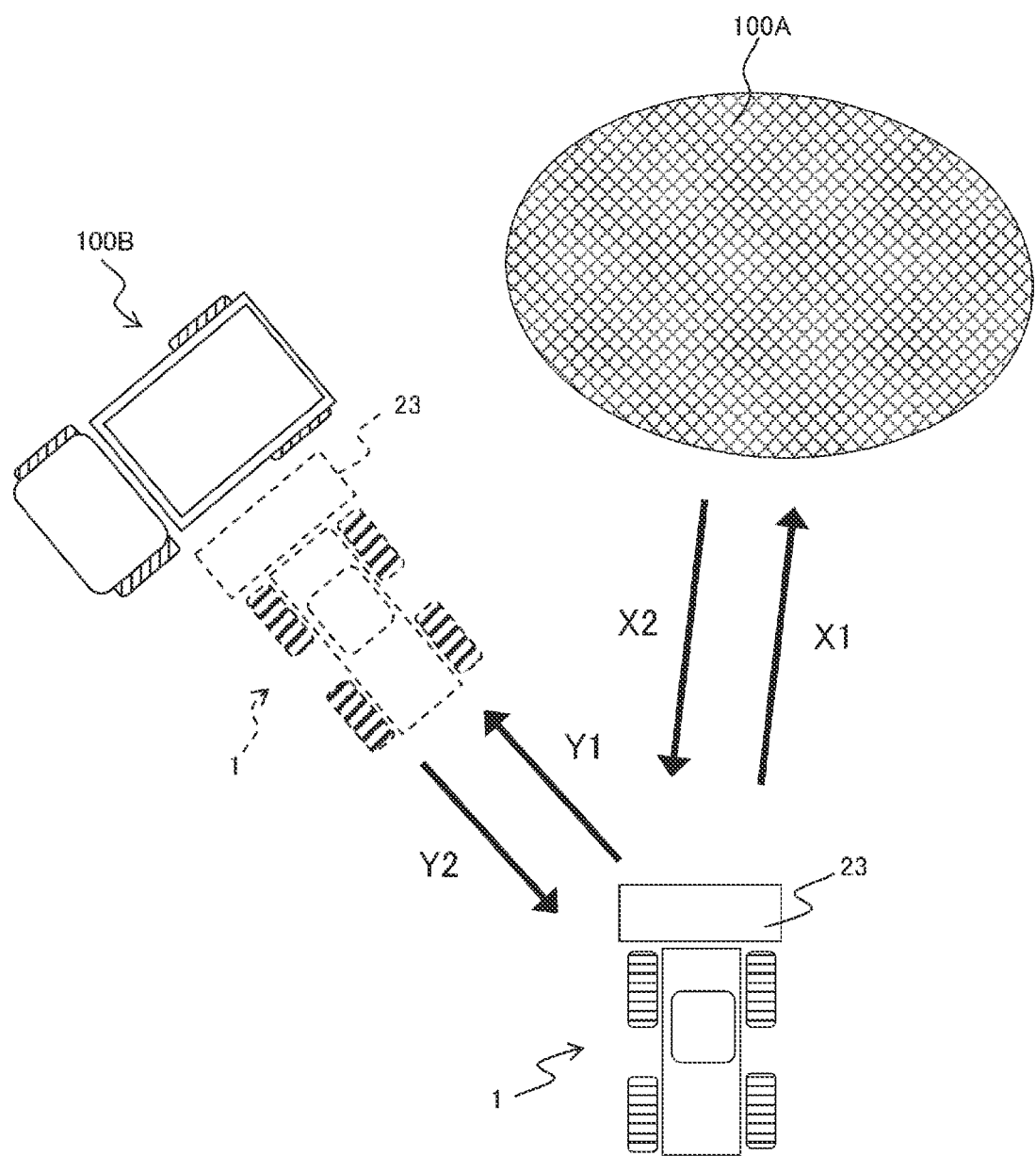
FIG. 2 explains V-shape loading performed by a wheel loader.
Figure 3:
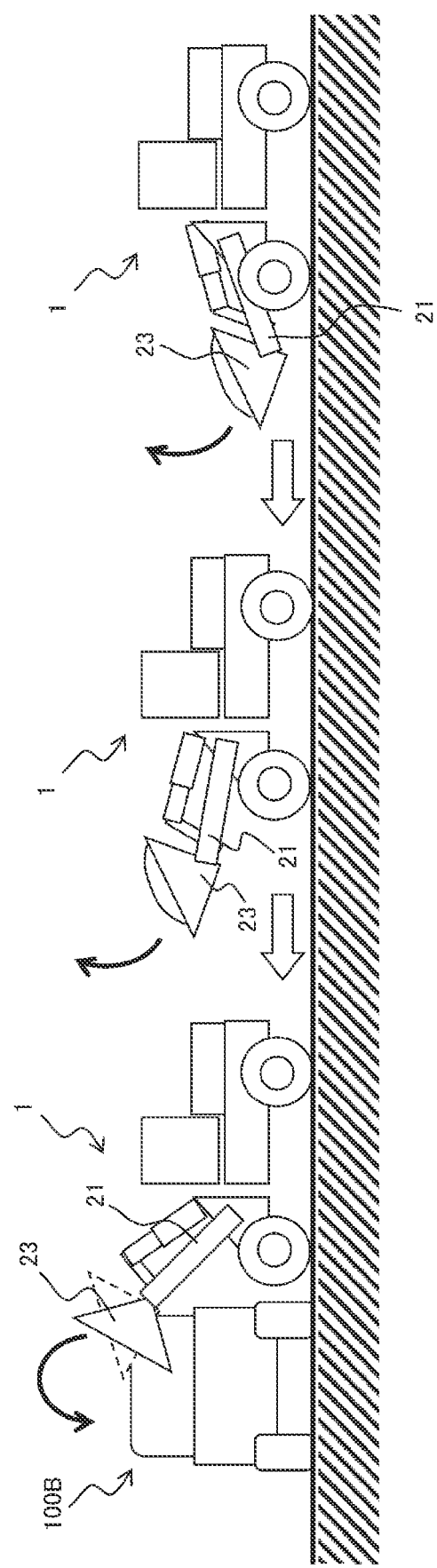
FIG. 3 explains raise and run operation performed by a wheel loader.

FIG. 2 explains the V-shape loading performed by the wheel loader 1. FIG. 3 explains raise and run operation performed by the wheel loader 1.

Firstly, the wheel loader 1 moves forward toward the ground 100A which is an object to be excavated (arrow X1 illustrated in FIG. 2), and performs excavation work by tilting the bucket 23 in a state of making the bucket 23 thrust into the ground 100A. When completing the excavation work, the wheel loader 1 temporarily moves backward to the original position in a state in which the load such as the excavated earth and sand and minerals is loaded on the bucket 23 (arrow X2 illustrated in FIG. 2).

Subsequently, the wheel loader 1 moves forward toward a dump truck 100B which is a loading destination of the load in the bucket 23 (arrow Y1 illustrated in FIG. 2), and stops in front of the dump truck 100B. FIG. 2 illustrates the wheel loader 1 in a state of being stopped in front of the dump truck 100B by indicating it with a broken line.

When the wheel loader 1 moves forward toward the dump truck 100B, as illustrated in FIG. 3, an operator fully steps on an accelerator pedal to make the wheel loader 1 travel at full throttle, and operates a lift arm operation lever to move the lift arm 21 in the upward direction (a state illustrated in FIG. 3 on its right side). Next, the operator moves the lift arm 21 further upward while maintaining a state of full throttle (a state illustrated in FIG. 3 on its center). Then, the operator operates a brake to decelerate the wheel loader 1 and make it stop in front of the dump truck 100B, operates a bucket operation lever to dump the bucket 23, and loads the load in the bucket 23 onto the dump truck 100B (a state illustrated in FIG. 3 on its left side). A series of operation illustrated in FIG. 3 is referred to as "raise and run operation".

When completing the loading work onto the dump truck 100B, the wheel loader 1 moves backward to the original position in a state in which no load is loaded in the bucket 23 (arrow Y2 illustrated in FIG. 2). In this manner, the wheel loader 1 travels reciprocally along the V-shape between the ground 100A and the dump truck 100B, and performs excavation work and loading work.

Next, a drive system of the wheel loader 1 will be described for each embodiment.

First Embodiment

The drive system of the wheel loader 1 according to the first embodiment of the present invention will be described with reference to FIGS. 4 to 15.

(Traveling Drive System)

Firstly, a traveling drive system of the wheel loader 1 will be described with reference to FIGS. 4 to 7.

Figure 4:
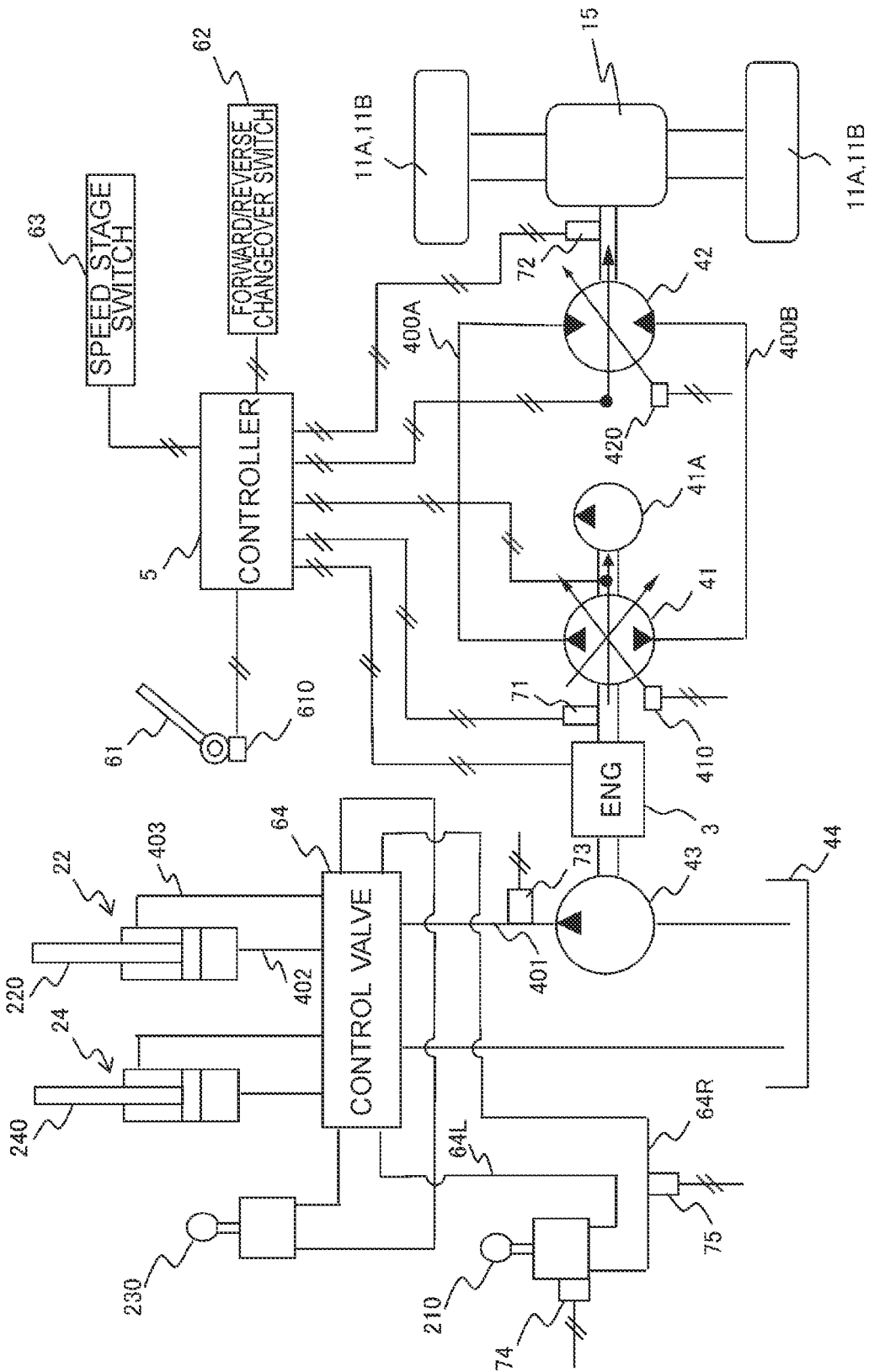
FIG. 4 illustrates a hydraulic circuit and an electric circuit of a wheel loader according to a first embodiment.
Figure 5:
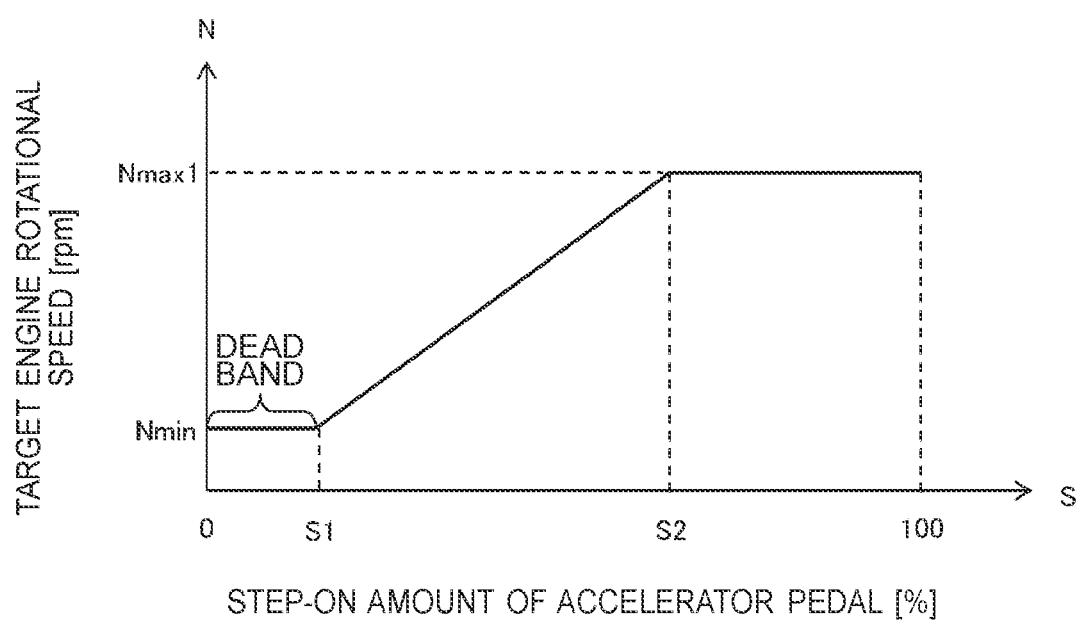
FIG. 5 illustrates a graph showing relationship between a step-on amount of an accelerator pedal and target engine rotational speed.
Figure 6:
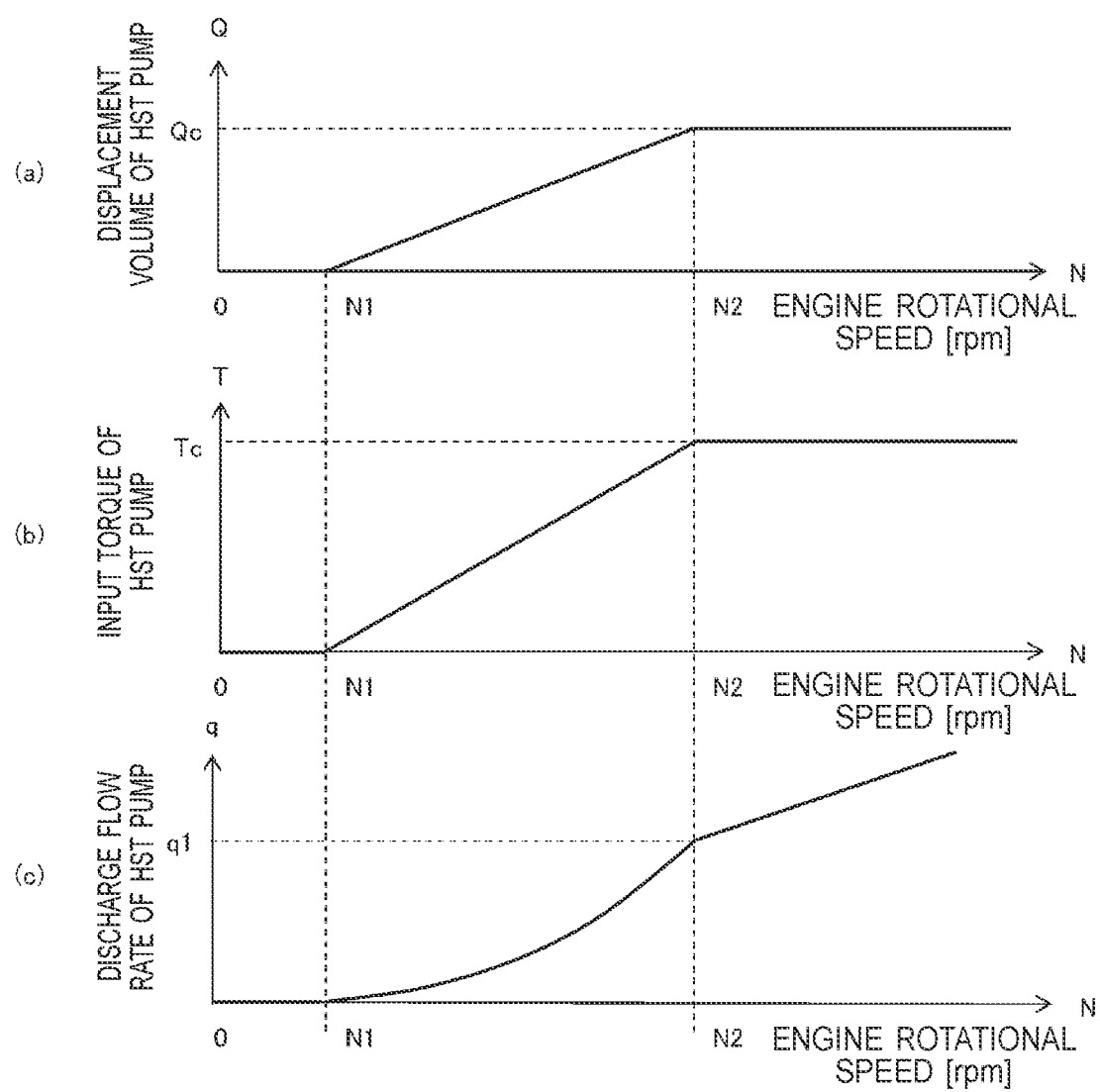
FIG. 6($a$) illustrates a graph showing relationship between engine rotational speed and displacement volume of an HST pump.
Figure 7:
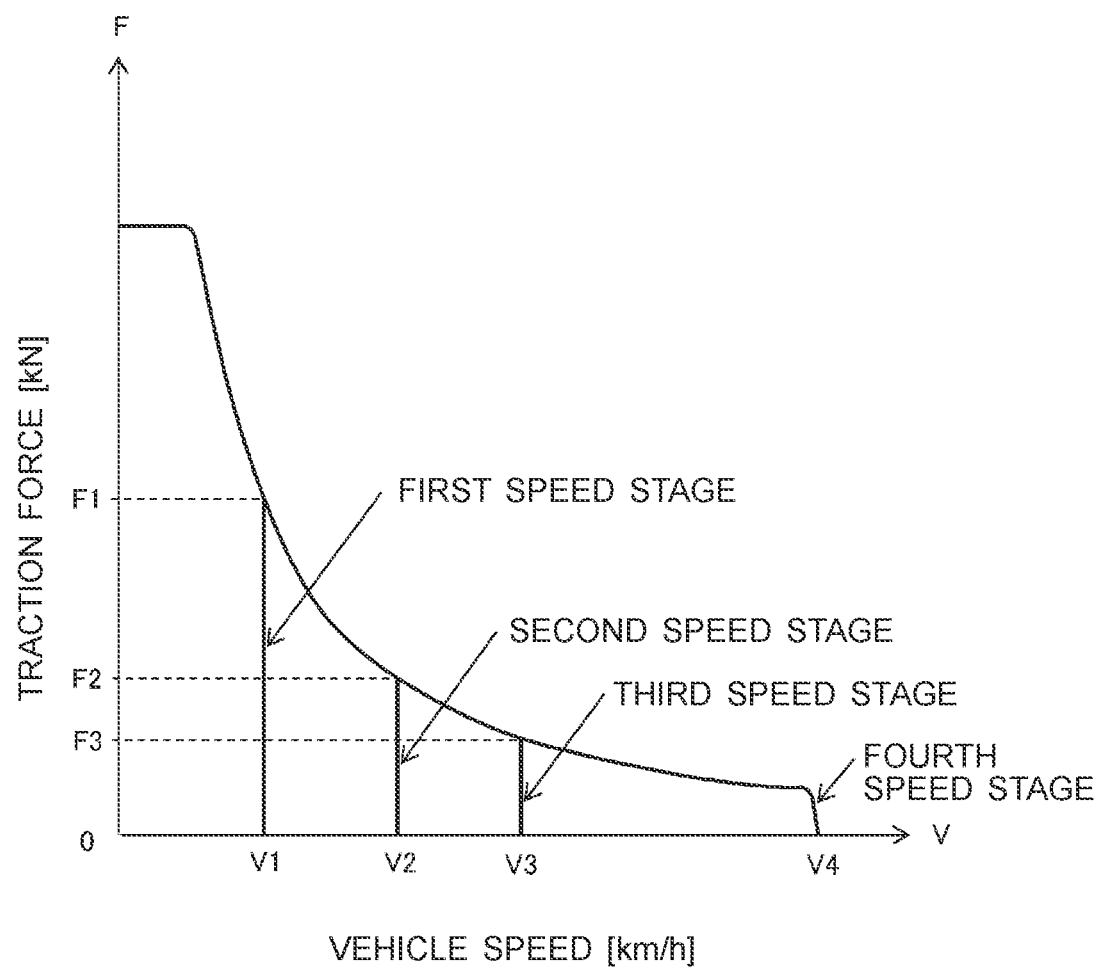
FIG. 7 illustrates a graph showing relationship between vehicle speed and traction force for each speed stage.

FIG. 4 illustrates a hydraulic circuit and an electric circuit of the wheel loader 1 according to the present embodiment. FIG. 5 illustrates a graph showing the relationship between a step-on amount of the accelerator pedal and the target engine rotational speed. FIG. 6($a$) illustrates a graph showing the relationship between the engine rotational speed and the displacement volume of an HST pump 41. FIG. 6($b$) illustrates a graph showing the relationship between the engine rotational speed and the input torque of the HST pump 41. FIG. 6($c$) illustrates a graph showing the relationship between the engine rotational speed and the discharge flow rate of the HST pump 41. FIG. 7 illustrates a graph showing the relationship between the vehicle speed and the traction force for each speed stage.

The wheel loader 1 according to the present embodiment includes an HST traveling drive device having a hydraulic circuit of a closed circuit. The HST traveling drive device includes, as illustrated in FIG. 4, an engine 3, an HST pump 41 as a traveling hydraulic pump driven by the engine 3, an HST charge pump 41A configured to supply pressure oil for controlling the HST pump 41, an HST motor 42 as a traveling hydraulic motor connected to the HST pump 41 in the shape of a closed circuit via a pair of conduits 400A and 400B, and a controller 5 configured to control each device such as the engine 3, the HST pump 41, and the HST motor 42.

The HST pump 41 is a swash plate type or a swash shaft type variable displacement hydraulic pump in which the displacement volume is controlled in accordance with a tilt angle. The tilt angle is adjusted by a pump regulator 410 in accordance with a command signal output from the controller 5.

The HST motor 42 is a swash plate type or a swash shaft type variable displacement hydraulic motor in which the displacement volume is controlled in accordance with a tilt angle, and transmits the driving force of the engine 3 to the wheels (front wheels 11A and rear wheels 11B). Similarly to the case of the HST pump 41, the tilt angle is adjusted by a motor regulator 420 in accordance with a command signal output from the controller 5.

In the HST traveling drive device, firstly, when the operator steps on an accelerator pedal 61 provided in the operator's cab 12, the engine 3 is rotated, and the HST pump 41 is driven by the driving force of the engine 3. Then, the HST motor 42 is rotated by the pressure oil discharged from the HST pump 41, and the output torque from the HST motor 42 is transmitted to the front wheels 11A and the rear wheels 11B via an axle 15, which makes the wheel loader 1 travel.

Specifically, a step-on amount sensor 610 attached to the accelerator pedal 61 detects a step-on amount of the accelerator pedal 61, and the detected step-on amount is input to the controller 5. Then, target engine rotational speed corresponding to the input step-on amount is output from the controller 5 to the engine 3 as a command signal. The rotational speed of the engine 3 is controlled in accordance with this target engine rotational speed. As illustrated in FIG. 4, an engine rotational speed sensor 71 provided on an output shaft of the engine 3 detects the rotational speed of the engine 3.

As illustrated in FIG. 5, the step-on amount of the accelerator pedal 61 is proportional to the target engine rotational speed, and thus the target engine rotational speed increases as the step-on amount of the accelerator pedal 61 increases. When the step-on amount of the accelerator pedal 61 reaches S2, the target engine rotational speed becomes the maximum rotational speed Nmax1. The maximum rotational speed Nmax1 of the engine 3 is a value set when the wheel loader 1 is traveling on the flat ground in a state in which the object handling device 2 (lift arm 21) is not operated (non-operating state), and is a set value at which the fuel efficiency of the engine 3 is good.

Accordingly, when the wheel loader 1 is traveling on the flat ground with the object handling device 2 being in a non-operating state, the maximum rotational speed of the engine 3 (hereinafter referred to as "maximum engine rotational speed") is limited to Nmax1 so as to reduce the loss horsepower to the object handling device 2 side and improve the fuel efficiency during traveling. In the following explanation, the "maximum engine rotational speed Nmax1 when the vehicle body with the object handling device 2 being in a non-operating state is traveling on the flat ground" is simply referred to as the "maximum engine rotational speed Nmax1 during traveling on the flat ground".

In FIG. 5, a range where the step-on amount of the accelerator pedal 61 is 0 to S1 (for example, the range of 0% to 20% or 30%) is set as a dead band in which the target engine rotational speed is constant at predetermined minimum engine rotational speed Nmin, regardless of the step-on amount of the accelerator pedal 61. The range of the dead band can be arbitrarily set and changed.

The relationship between the engine 3 and the HST pump 41 is as illustrated in FIGS. 6($a$) to 6($c$).

As illustrated in FIG. 6($a$), when the engine rotational speed is between N1 and N2, the rotational speed N of the engine 3 is proportional to the displacement volume Q of the HST pump 41, and as the rotational speed of the engine 3 increases from N1 to N2 (N1<N2), the displacement volume increases from 0 to a predetermined value Qc. When the engine rotational speed is equal to or greater than N2, the displacement volume of the HST pump 41 is constant at the predetermined value Qc regardless of the engine rotational speed.

The input torque of the HST pump 41 is obtained by multiplying the displacement volume by the discharge pressure (input torque=displacement volume×discharge pressure). As illustrated in FIG. 6($b$), when the engine rotational speed is between N1 and N2, the rotational speed N of the engine 3 is proportional to the input torque T of the HST pump 41, and as the rotational speed of the engine 3 increases from N1 to N2, the input torque increases from 0 to a predetermined value Tc. When the engine rotational speed is equal to or greater than N2, the input torque of the HST pump 41 is constant at the predetermined value Tc regardless of the engine rotational speed.

As illustrated in FIG. 6($c$), when the engine rotational speed is between N1 and N2, the discharge flow rate q of the HST pump 41 is quadratically proportional to the rotational speed N of the engine 3, and as the rotational speed of the engine 3 increases from N1 to N2, the discharge flow rate of the HST pump 41 increases from 0 to q1. When the engine rotational speed is equal to or greater than N2, the rotational speed N of the engine 3 is linearly proportional to the discharge flow rate q of the HST pump 41.

Accordingly, when the rotational speed N of the engine 3 increases, the discharge flow rate q of the HST pump 41 increases, and the flow rate of the pressure oil flowing from the HST pump 41 into the HST motor 42 increases. As a result, the rotational speed of the HST motor 42 increases, and thus the vehicle speed increases. A motor rotational speed sensor 72 detects the vehicle speed as the rotational speed of the HST motor 42 (see FIG. 4).

As described above, in the HST traveling drive device, since the vehicle speed is controlled by continuously increasing or decreasing the discharge flow rate of the HST pump 41, the wheel loader 1 can smoothly start and stop with little impact. When controlling the vehicle speed, the discharge flow rate of the HST pump 41 does not necessarily need to be adjusted, meanwhile, the displacement volume of the HST motor 42 may be adjusted.

Selection of the traveling direction of the wheel loader 1, that is, selection of forward direction movement or reverse direction movement is performed by a forward/reverse changeover switch 62 (see FIG. 4) provided in the operator's cab 12. Specifically, when the operator switches the forward/reverse changeover switch 62 to a forward movement position, a forward/reverse changeover signal indicating the forward direction movement is input to the controller 5. The controller 5 outputs a command signal to the HST pump 41 to direct the pump tilt to the forward side, so that the vehicle body is directed to the forward direction by the pressure oil discharged from the HST pump 41. Then, the pressure oil discharged from the HST pump 41 is guided to the HST motor 42, and the HST motor 42 is rotated in a direction corresponding to the forward movement, which moves the vehicle body in the forward direction. The reverse direction movement of the vehicle body is also switched by the same mechanism.

In the present embodiment, a speed stage switch 63 (see FIG. 4) capable of setting the maximum vehicle speed to one of the one to four speed stages as illustrated in FIG. 7 is provided. As illustrated in FIG. 7, the maximum vehicle speed is set to V1 at the first speed stage, the maximum vehicle speed is set to V2 at the second speed stage, the maximum vehicle speed is set to V3 at the third speed stage, and the maximum vehicle speed is set to V4 at the fourth speed stage. Note that the high/low relationship among V1, V2, V3, and V4 is V1<V2<V3<V4. FIG. 7 illustrates the relationship between the maximum vehicle speed and the traction force for each speed stage, in which the traction force is set to F1 when the maximum vehicle speed is V1, the traction force is set to F2 when the maximum vehicle speed is V2, the traction force is set to F3 when the maximum vehicle speed is V3, and the traction force is set to 0 when the maximum vehicle speed is V4. The high/low relationship among F1, F2, and F3 is F1>F2>F3.

Among the first to fourth speed stages, the first speed stage and the second speed stage correspond to a "low speed stage" and the third speed stage and the fourth speed stage correspond to a "medium to high speed stage", respectively. The "low speed stage" is selected when the wheel loader 1 travels toward the dump truck 100B (arrow Y1 illustrated in FIG. 2) which is the loading destination during the loading work, and the maximum vehicle speed at this time is set to, for example, 9 to 15 km/hr.

(Drive System for Object Handling Device 2)

Next, a drive system of the object handling device 2 will be described with reference to FIGS. 4 and 8.

Figure 8:
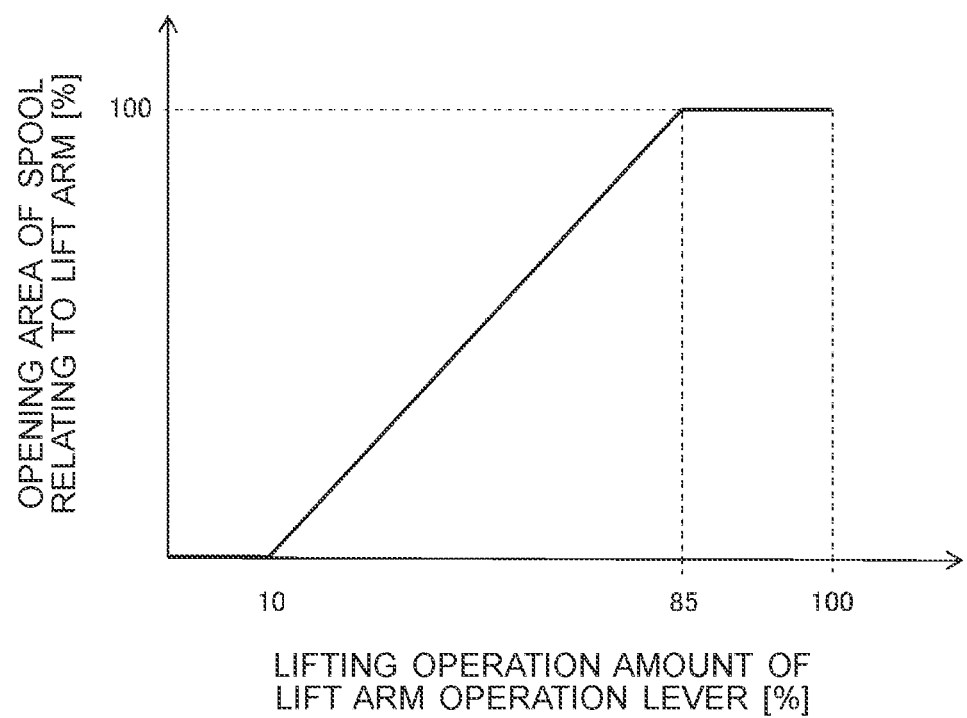
FIG. 8 illustrates a graph showing relationship between a lifting operation amount of a lift arm operation lever and opening area of a spool.

FIG. 8 illustrates a graph showing the relationship between a lifting operation amount of a lift arm operation lever 210 and the opening area of a spool.

As illustrated in FIG. 4, the wheel loader 1 includes an object handling hydraulic pump 43 driven by the engine 3 and configured to supply hydraulic oil to the object handling device 2, a hydraulic oil tank 44 configured to store the hydraulic oil, the lift arm operation lever 210 for operating the lift arm 21, a bucket operation lever 230 for operating the bucket 23, and a control valve 64 provided between each of the lift arm cylinder 22 and the bucket cylinder 24 and the object handling hydraulic pump 43 and configured to control the flow of the hydraulic oil supplied from the object handling hydraulic pump 43 to the lift arm cylinder 22 and the bucket cylinder 24, respectively.

In the present embodiment, a fixed hydraulic pump is used as the object handling hydraulic pump 43, and is connected to the control valve 64 through a first conduit 401. A discharge pressure sensor 73 provided on the first conduit 401 detects the discharge pressure from the object handling hydraulic pump 43, and a signal relating to the detected discharge pressure is input to the controller 5. The discharge pressure sensor 73 is one aspect of a discharge pressure sensor for detecting the discharge pressure of the object handling hydraulic pump 43.

Each of the lift arm operation lever 210 and the bucket operation lever 230 is one aspect of an operation device for operating the object handling device 2, and is provided in the operator's cab 12 (see FIG. 1). For example, when the operator operates the lift arm operation lever 210, pilot pressure proportional to the operation amount is generated as an operation signal.

As illustrated in FIG. 4, the generated pilot pressure is guided to a pair of pilot conduits 64L and 64R connected to a pair of pressure receiving chambers of the control valve 64, and acts on the control valve 64. As a result, the spool in the control valve 64 strokes in accordance with the pilot pressure, and the flow direction and flow rate of the hydraulic oil are determined. The control valve 64 is connected to a bottom chamber of the lift arm cylinder 22 through a second conduit 402, and is connected to a rod chamber of the lift arm cylinder 22 through a third conduit 403.

The hydraulic oil discharged from the object handling hydraulic pump 43 is guided to the first conduit 401, and then guided to the second conduit 402 or the third conduit 403 via the control valve 64. When being guided to the second conduit 402, the hydraulic oil flows into the bottom chamber of the lift arm cylinder 22, whereby the rod 220 of the lift arm cylinder 22 expands and the lift arm 21 is lifted. On the other hand, when being guided to the third conduit 403, the hydraulic oil flows into the rod chamber of the lift arm cylinder 22, whereby the rod 220 of the lift arm cylinder 22 contracts and the lift arm 21 is lowered.

In the present embodiment, both the lift arm operation lever 210 and the bucket operation lever 230 are hydraulic levers, meanwhile, electric levers may be used therefor.

In such a case, a current value corresponding to an operation amount is generated as an operation signal.

As illustrated in FIG. 4, an operation amount sensor 74 attached to the lift arm operation lever 210 detects the lifting operation amount of the lift arm operation lever 210. Furthermore, a pilot pressure sensor 75 provided on the pilot conduit (illustrated in FIG. 4 as the pilot conduit 64R) corresponding to the lifting operation of the lift arm 21 detects the pilot pressure. The operation amount sensor 74 is one aspect of an operation amount sensor for detecting an operation amount of the lift arm operation lever 210 which is an operation device, and the pilot pressure sensor 75 is one aspect of an operation signal sensor for detecting an operation signal from the lift arm operation lever 210 which is an operation device.

As illustrated in FIG. 8, the lifting operation amount of the lift arm operation lever 210 is proportional to the opening area of the spool of the control valve 64, and when the lifting operation amount of the lift arm operation lever 210 increases, the opening area of the spool also increases. Therefore, when the lift arm operation lever 210 is operated largely in the direction of moving up the lift arm 21, the amount of hydraulic oil flowing into the bottom chamber of the lift arm cylinder 22 increases, and the rod 220 rapidly expands. That is, as the operation amount of the lift arm operation lever 210 increases, the operation speed of the lift arm 21 increases.

In FIG. 8, a range in which the lifting operation amount of the lift arm operation lever 210 is 0 to 10% is set as a dead band in which the spool does not open even when the lift arm operation lever 210 is operated and the opening area becomes 0%. In a range in which the lifting operation amount of the lift arm operation lever 210 is 85 to 100%, the opening area of the spool is constant at 100%, and a full lever operation state is maintained. Note that these setting ranges can be arbitrarily changed.

Here, each of the discharge pressure of the object handling hydraulic pump 43, the operation amount of the lift arm operation lever 210, and the pilot pressure is an index indicating an operation state of the lift arm 21, and each of the discharge pressure sensor 73, the operation amount sensor 74, and the pilot pressure sensor 75 is one aspect of an operation state sensor for detecting an operation state of the lift arm 21 by the lift arm operation lever 210.

In order to accurately detect the operation state of the lift arm 21, it is preferable to use all the values respectively detected by the discharge pressure sensor 73, the operation amount sensor 74, and the pilot pressure sensor 75. Meanwhile, as the operation state sensor, at least one of the discharge pressure sensor 73, the operation amount sensor 74, and the pilot pressure sensor 75 may be used.

The operation of the bucket 23 is performed in the same manner as the operation of the lift arm 21, that is, the pilot pressure generated in accordance with the operation amount of the bucket operation lever 230 acts on the control valve 64, whereby the opening area of the spool of the control valve 64 is controlled, and the amount of hydraulic oil flowing into and out of the bucket cylinder 24 is adjusted. Although not illustrated in FIG. 4, sensors and the like for detecting the operation state of the bucket 23 are also provided on each conduit of the hydraulic circuit.

(Configuration of Controller 5)

Next, the configuration of the controller 5 will be described with reference to FIG. 9.

Figure 9:
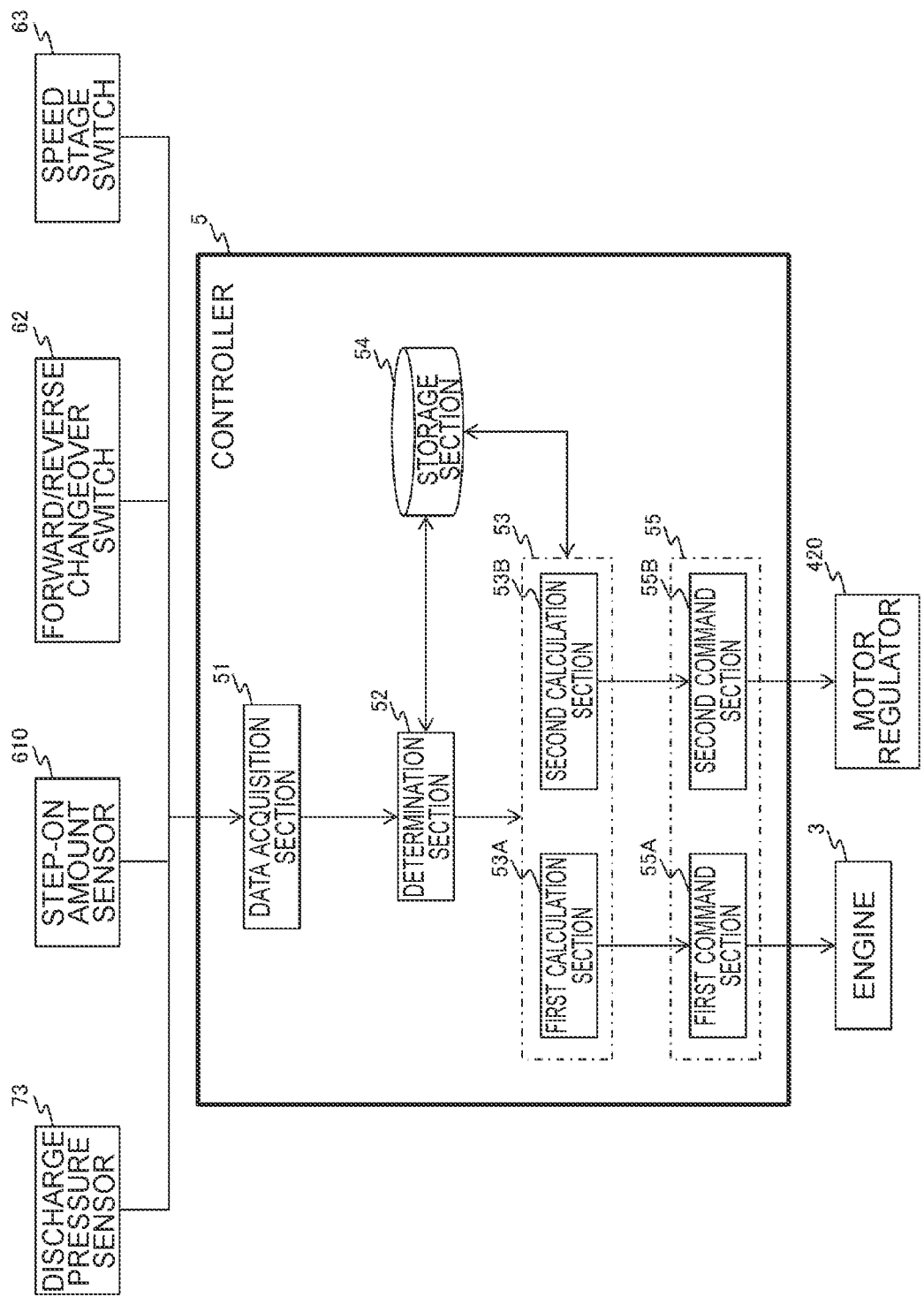
FIG. 9 is a functional block diagram showing functions of a controller.

FIG. 9 is a functional block diagram showing functions of the controller 5.

The controller 5 includes a CPU, a RAM, a ROM, an HDD, an input I/F, and an output I/F which are connected to each other via a bus. Various operation devices such as the forward/reverse changeover switch 62 and the speed stage switch 63, and various sensors such as the discharge pressure sensor 73 and the step-on amount sensor 610 are connected to the input I/F. The engine 3, the motor regulator 420 for the HST motor 42, etc. are connected to the output I/F.

In this hardware configuration, the CPU reads out an arithmetic program (software) stored in a recording medium such as the ROM, the HDD, or an optical disk, expands it on the RAM, and executes the expanded arithmetic program. Thereby, the arithmetic program and the hardware are operated in cooperation, which realizes the function of the controller 5.

In the present embodiment, the controller 5 is described by a combination of software and hardware. Meanwhile, the present invention is not limited to this, but an integrated circuit that realizes the function of an arithmetic program executed on the side of the wheel loader 1 may be used.

As illustrated in FIG. 9, the controller 5 includes a data acquisition section 51, a determination section 52, a calculation section 53, a storage section 54, and a command section 55.

The data acquisition section 51 acquires data relating to the forward/reverse changeover signal output from the forward/reverse changeover switch 62, the step-on amount of the accelerator pedal 61 detected by the step-on amount sensor 610, the discharge pressure of the object handling hydraulic pump 43 detected by the discharge pressure sensor 73, and the speed stage signal output from the speed stage switch 63.

The determination section 52 determines whether the wheel loader 1 is traveling forward based on the forward/reverse changeover signal and the step-on amount of the accelerator pedal 61 acquired by the data acquisition section 51, and determines whether the lifting operation of the lift arm 21 is being performed based on the discharge pressure acquired by the data acquisition section 51. Hereinafter, a condition for specifying upward movement of the lift arm 21 during forward traveling of the wheel loader 1 is referred to as a "specific condition". A case where this "specific condition" is satisfied is the case where the raise and run operation described above is performed.

Here, each of the forward/reverse changeover switch 62 and the step-on amount sensor 610 is one aspect of a traveling state sensor for detecting a traveling state of the vehicle body of the wheel loader 1. In the present embodiment, whether the vehicle body is traveling forward is determined based on the forward/reverse changeover signal indicating the forward direction movement output from the forward/reverse changeover switch 62 and the step-on amount of the accelerator pedal 61 detected by the step-on amount sensor 610. Meanwhile, the present invention is not limited to this, but whether the vehicle body is traveling forward may be determined comprehensively based on a traveling state detected by other traveling state sensors mounted on the vehicle body, such as the one that detects whether the traveling direction of the vehicle body is forward or reverse based on the rotating direction of a propeller shaft.

Furthermore, in the present embodiment, whether the lifting operation of the lift arm 21 by the lift arm operation lever 210 is performed is determined based on the discharge pressure detected by the discharge pressure sensor 73. Meanwhile, the present invention is not limited to this, but the operation amount of the lift arm operation lever 210 detected by the operation amount sensor 74 or the pilot pressure detected by the pilot pressure sensor 75 may be used therefor.

In the present embodiment, the determination section 52 determines whether the low speed stage is selected by the speed stage switch 63 based on the speed stage signal acquired by the data acquisition section 51, and determines whether the lifting operation of the lift arm 21 is stopped based on the discharge pressure acquired by the data acquisition section 51. Here, a "state in which the lifting operation of the lift arm 21 is stopped" is the state in which the operator returns the lift arm operation lever 210 to a neutral position.

The calculation section 53 includes a first calculation section 53A and a second calculation section 53B. When the determination section 52 determines that the specific condition is satisfied (raise and run operation is being performed), the first calculation section 53A calculates a value Nmax2 which is greater than the maximum engine rotational speed Nmax1 during traveling on the flat ground (Nmax2>Nmax1). When the determination section 52 determines that the specific condition is satisfied (raise and run operation is being performed), the second calculation section 53B calculates a value Qmin2 which is greater than the minimum displacement volume Qmin1 of the HST motor 42 prior to the lifting operation of the lift arm 21 (Qmin2>Qmin1).

The storage section 54 stores thresholds for determining the operation of the wheel loader 1 such as the determination for traveling of the wheel loader 1 and the determination for lifting operation of the lift arm 21, respectively. In addition, the storage section 54 stores the maximum engine rotational speed Nmax1 during traveling on the flat ground and the minimum displacement volume Qmin1 of the HST motor 42 prior to the lifting operation of the lift arm 21, respectively.

The command section 55 includes a first command section 55A and a second command section 55B. The first command section 55A outputs to the engine 3 a command signal based on Nmax2 calculated by the first calculation section 53A. The second command section 55B outputs to the motor regulator 420 a command signal based on Qmin2 calculated by the second calculation section 53B.

(Processing in Controller 5)

Next, a specific flow of processing executed in the controller 5 will be described with reference to FIG. 10.

Figure 10:
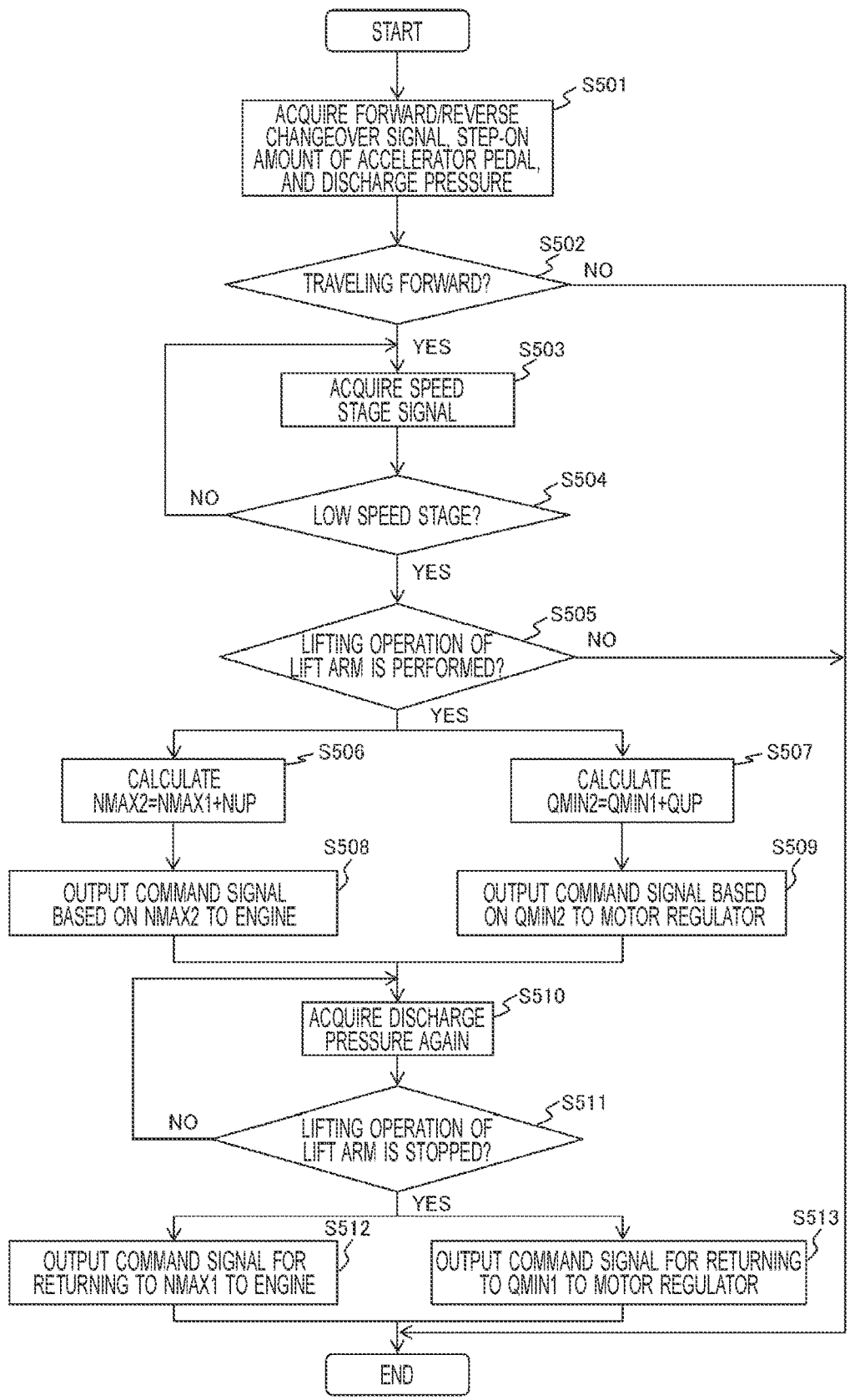
FIG. 10 illustrates a flowchart showing a flow of processing executed by a controller.

FIG. 10 illustrates a flowchart showing a flow of the processing executed by the controller 5.

Firstly, the data acquisition section 51 acquires a forward/reverse changeover signal output from the forward/reverse changeover switch 62, a step-on amount of the accelerator pedal 61 output from the step-on amount sensor 610, and discharge pressure of the object handling hydraulic pump 43 output from the discharge pressure sensor 73 (step S501).

Next, the determination section 52 determines whether the wheel loader 1 is traveling forward based on the forward/reverse changeover signal acquired in step S501 and the step-on amount of the accelerator pedal 61 (step S502).

When it is determined in step S502 that the vehicle is traveling forward (step S502/YES), the data acquisition section 51 acquires a speed stage signal output from the speed stage switch 63 (step S503). Next, the determination section 52 determines whether a speed stage is a low speed stage based on the speed stage signal acquired in step S503 (step S504).

When it is determined in step S504 that the speed stage is the low speed stage (step S504/YES), the determination section 52 determines whether the lifting operation of the lift arm 21 is being performed based on the discharge pressure acquired in step S501 (step S505).

When it is determined in step S505 that the lifting operation of the lift arm 21 is being performed (step S505/YES), the first calculation section 53A calculates a value Nmax2 (=Nmax1+Nup) which is obtained by adding a predetermined increase amount Nup to the maximum engine rotational speed Nmax1 during traveling on the flat ground (step S506), and the second calculation section 53B calculates a value Qmin2 (=Qmin1+Qup) which is obtained by adding a predetermined increase amount Qup to the minimum displacement volume Qmin1 of the HST motor 42 (step S507).

Next, the first command section 55A outputs to the engine 3 a command signal based on Nmax2 calculated in step S506 (step S508), and the second command section 55B outputs to the motor regulator 420 a command signal based on Qmin2 calculated in step S507 (step S509).

As a result, the setting of the maximum engine rotational speed is changed from Nmax1, which is set when the vehicle body is traveling on the flat ground with the object handling device 2 being in a non-operating state, to Nmax2 which is greater than Nmax1. Furthermore, the setting of the minimum displacement volume of the HST motor 42 is changed from Qmin1, which is set prior to the lifting operation of the object handling device 2, to Qmin2 which is greater than Qmin1.

In the present embodiment, when it is determined in step S504 that the speed stage is not the low speed stage (step S504/NO), the processing returns to step S503 and does not proceed until the speed stage becomes the low speed stage. This is because the low speed stage (particularly, the second speed stage in FIG. 7) is suitable for the raise and run operation, and it is desirable to increase the maximum engine rotational speed and limit the vehicle speed only when the low speed stage is selected.

Next, the data acquisition section 51 acquires the discharge pressure of the object handling hydraulic pump 43 output from the discharge pressure sensor 73 again (step S510). Subsequently, the determination section 52 determines whether the lifting operation of the lift arm 21 is stopped based on the discharge pressure acquired in step S510 (step S511).

When it is determined in step S511 that the lifting operation of the lift arm 21 is stopped (step S511/YES), the first command section 55A outputs to the engine 3 a command signal for returning the maximum engine rotational speed, which has been increased to Nmax2, to Nmax1 which is the maximum engine rotational speed during traveling on the flat ground (step S512), the second command section 55B outputs to the motor regulator 420 a command signal for returning the minimum displacement volume of the HST motor 42, which has been increased to Qmin2, to Qmin1 which is the minimum displacement volume of the HST motor 42 prior to the lifting operation of the lift arm 21 (step S513), and the processing in the controller 5 ends.

When it is not determined in step S511 that the lifting operation of the lift arm 21 is stopped, that is, when the lifting operation of the lift arm 21 is continuously performed (step S511/NO), the processing returns to step S510.

Both cases in which it is determined in step S502 that the wheel loader 1 is not traveling forward (stopped or moving backward) (step S502/NO) and in which it is determined in step S505 that the lifting operation of the lift arm 21 is not performed (step S505/NO) do not satisfy the specific condition, and accordingly, the processing in the controller 5 ends. That is, a "case in which the specific condition is satisfied" is the case in which YES is obtained in step S502 and YES is obtained in step S505.

In the present embodiment, at the time of determining whether the specific condition is satisfied, the discharge pressure of the object handling hydraulic pump 43 detected by the discharge pressure sensor 73 is used and whether the lifting operation of the lift arm 21 is performed is determined. Accordingly, it is possible to reduce erroneous determination for the lifting operation of the lift arm 21 as compared with the case of using the bottom pressure of the lift arm cylinder 22, for example. This is because, even in a state in which the lifting operation of the lift arm 21 is not performed, that is, even when the lift arm operation lever 210 is in the neutral position, the pressure for holding the weight of the bucket 23 and the load acts on the bottom chamber side of the lift arm cylinder 22, on the other hand, by detecting the discharge pressure of the load handling hydraulic pump 43, it is possible to reliably determine that the lifting operation of the lift arm 21 is performed.

(Operation According to Control by Controller 5)

Next, operation according to the control by the controller 5 will be described with reference to FIGS. 11 to 15.

Figure 12:
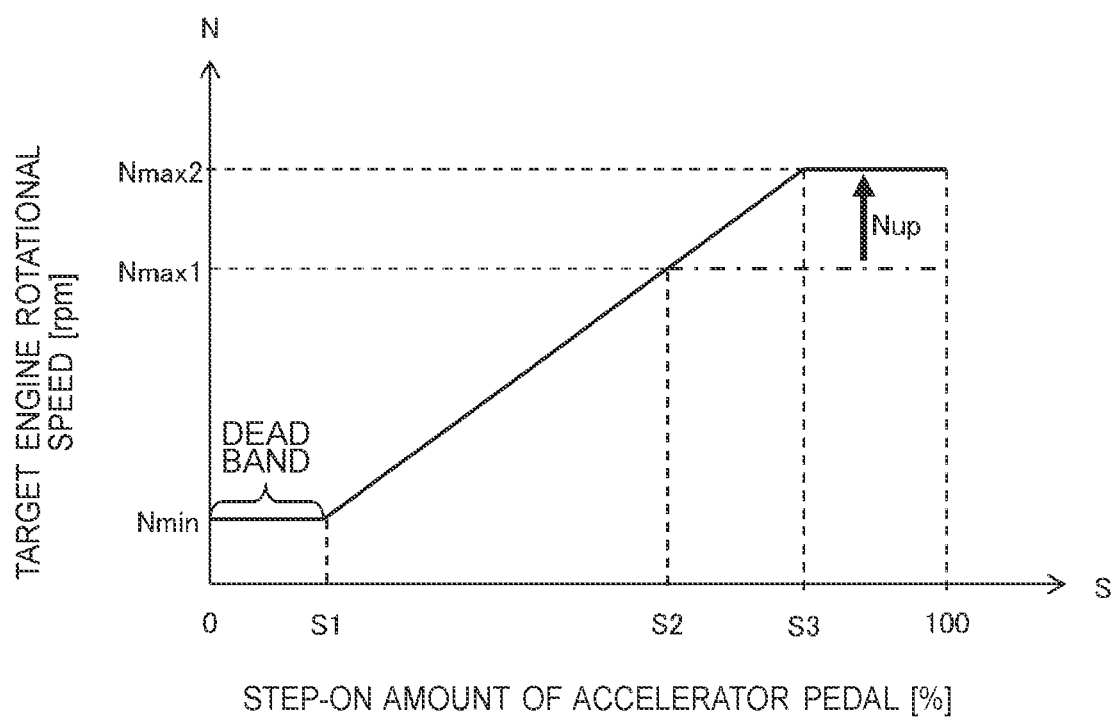
FIG. 12 illustrates a graph showing relationship between a step-on amount of an accelerator pedal and target engine rotational speed when control by a controller is executed.
Figure 13:
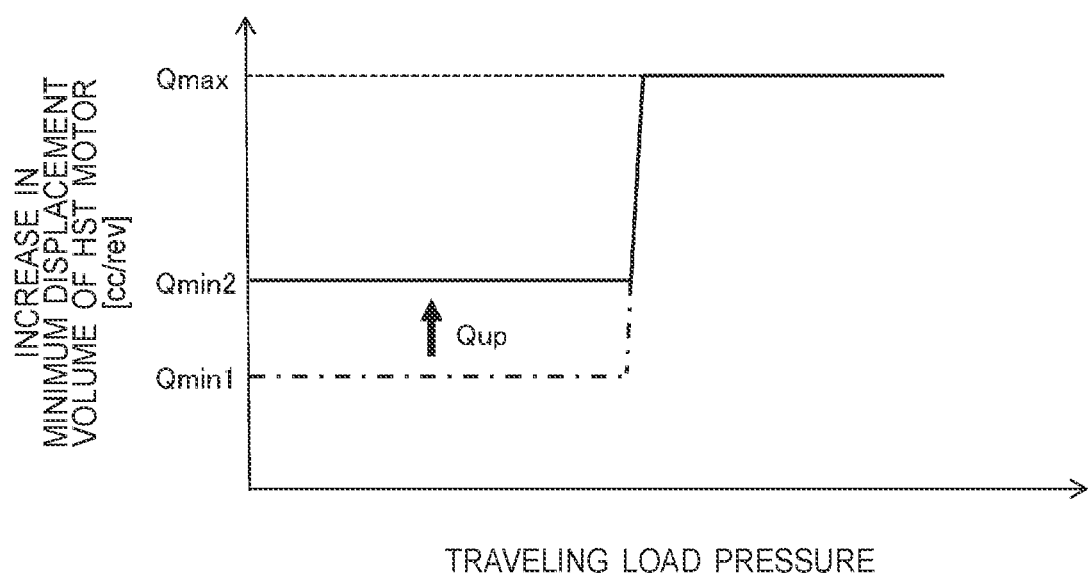
FIG. 13 illustrates a graph showing relationship between traveling load pressure and minimum displacement volume of an HST motor when control by a controller is executed.
Figure 14:
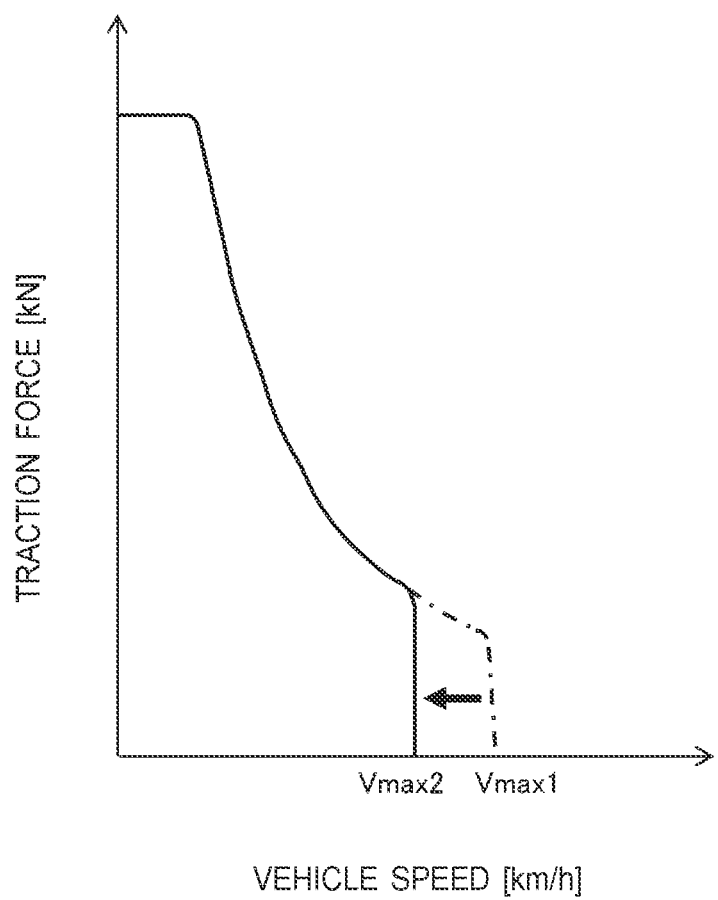
FIG. 14 illustrates a graph showing relationship between vehicle speed and traction force when control by a controller is executed.

FIG. 11(*a*) illustrates a graph showing the relationship between the discharge pressure of the object handling hydraulic pump 43 and increase in the maximum engine rotational speed, and FIG. 11(*b*) illustrates a graph showing the relationship between the discharge pressure of the object handling hydraulic pump 43 and increase in the minimum displacement volume of the HST motor 42. FIG. 12 illustrates a graph showing the relationship between a step-on amount of the accelerator pedal and the target engine rotational speed when the control by the controller 5 is executed. FIG. 13 illustrates a graph showing the relationship between the traveling load pressure and the minimum displacement volume of the HST motor 42 when the control by the controller 5 is executed. FIG. 14 illustrates a graph showing the relationship between the vehicle speed and the traction force when the control by the controller 5 is executed.

As illustrated in FIG. 11(*a*), when the discharge pressure detected by the discharge pressure sensor 73 becomes the pressure relating to the start of the lifting operation of the lift arm 21 (for example, about 10% of the relief pressure), that is, when the determination section 52 determines that the lifting operation of the lift arm 21 is performed (step S505/YES in FIG. 10), the amount of increase in the maximum engine rotational speed rapidly increases to a predetermined value Nup, and thereafter, becomes constant at the predetermined value Nup regardless of increase in the discharge pressure.

As illustrated in FIG. 12, when the wheel loader 1 starts the raise and run operation, the maximum engine rotational speed rapidly increases from the maximum engine rotational speed Nmax1 during traveling on the flat ground (indicated by a one-dot dashed line in FIG. 12) to Nmax2. As a result, the discharge flow rate of the object handling hydraulic pump 43 rapidly increases, and the lift arm 21 can be quickly moved in the upward direction. The step-on amount of the accelerator pedal 61 at the maximum rotational speed Nmax2 is S3 which is greater than the step-on amount S2 corresponding to the maximum engine rotational speed Nmax1 during traveling on the flat ground (S3>S2).

Furthermore, as illustrated in FIG. 11(*b*), when the determination section 52 determines that the lifting operation of the lift arm 21 is performed (step S505/YES in FIG. 10), the amount of increase in the minimum displacement volume of the HST motor 42 rapidly increases to a predetermined value Qup, and thereafter, becomes constant at the predetermined value Qup regardless of increase in the discharge pressure.

As illustrated in FIG. 13, when the wheel loader 1 starts the raise and run operation, the minimum displacement volume of the HST motor 42 rapidly increases from the minimum displacement volume Qmin1 prior to the lifting operation of the lift arm 21 (indicated by a one-dot dashed line in FIG. 13) to Qmin2. As a result, as illustrated in FIG. 14, the maximum vehicle speed of the wheel loader 1 is limited (deceleration) from the maximum vehicle speed Vmaxl prior to the lifting operation of the lift arm 21 (indicated by a one-dot dashed line in FIG. 14) to Vmax2 which is smaller than Vmaxl. The relationship between the vehicle speed and the traction force illustrated in FIG. 14 is in the case in which the speed stage is the low speed stage.

As described above, by quickly operating the lift arm 21 in a short time in the upward direction and by limiting the vehicle speed (decelerating), as compared with the case of not performing the control by the controller 5, it is possible to shorten a traveling distance from the wheel loader 1 to the dump truck 100B (in FIG. 2, distance from the wheel loader 1 illustrated by a solid line to the wheel loader 1 illustrated by a broken line). For example, it is possible to perform loading work even when the work site is narrow and thus only a limited traveling distance can be secured.

In this connection, by quickly operating the lift arm 21 in the upward direction in a short time, the cycle time of the work in the V-shape loading is shortened as compared with the control in which only the vehicle speed is limited with respect to the lifting operation speed of the lift arm 21, so that the work efficiency is improved and the fuel consumption of the wheel loader 1 can be reduced even during the object handling work.

In the present embodiment, the vehicle speed is limited by increasing the minimum displacement volume of the HST motor 42. Meanwhile, the present invention is not limited to this, but the vehicle speed may be limited by decreasing the maximum displacement volume of the HST pump 41.

Next, a series of operation of each device when the control by the controller 5 is executed will be described with reference to FIG. 15.

Figure 15:
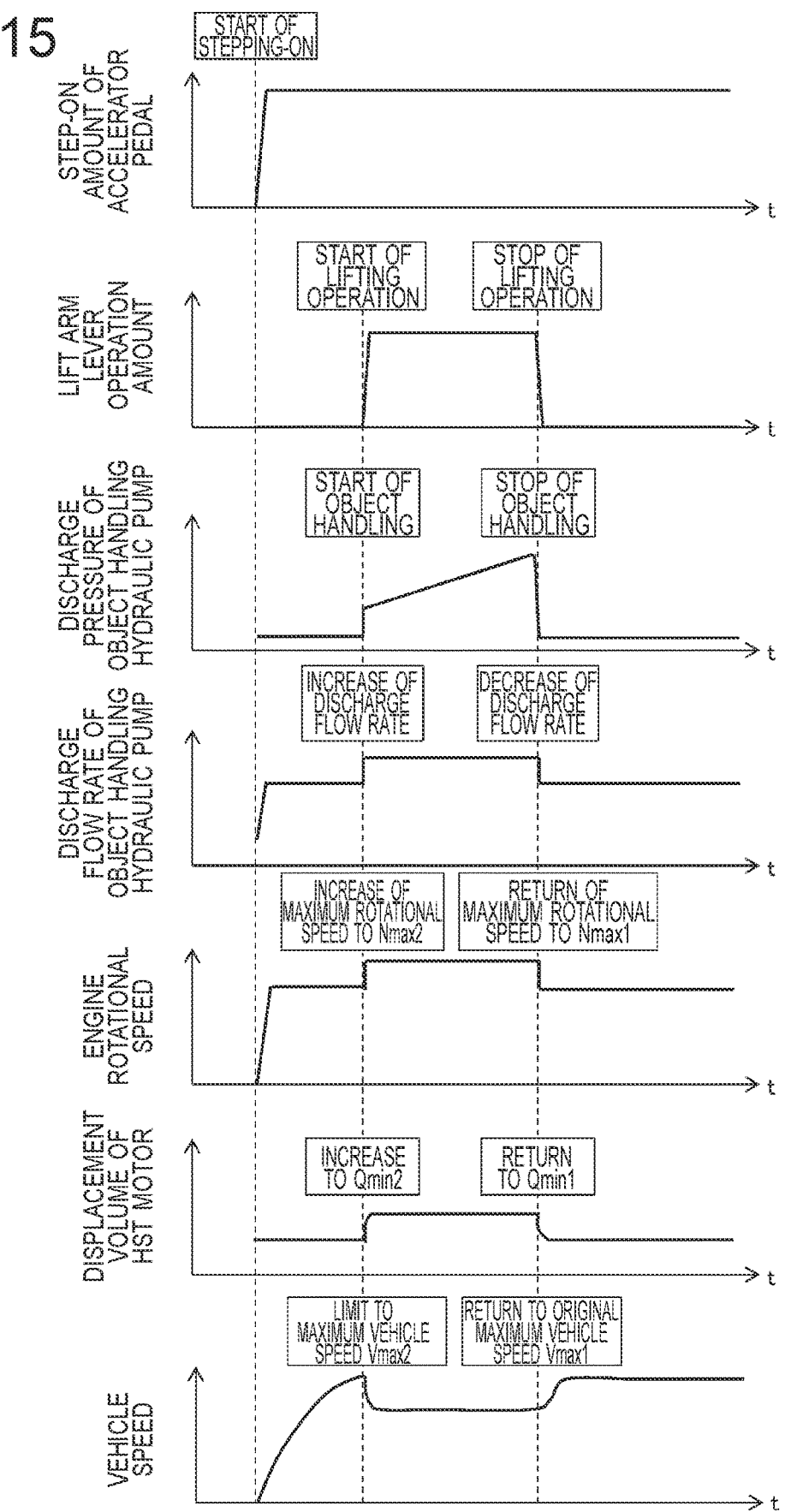
FIG. 15 explains operation of each device according to control by a controller.

FIG. 15 explains the operation of each device according to the control by the controller 5.

Firstly, when the operator steps on the accelerator pedal 61 (start of stepping-on), the rotational speed of the engine 3 increases and the vehicle speed of the engine 3 gradually increases toward the maximum vehicle speed Vmaxl. At this time, the maximum engine rotational speed is limited to Nmax1, and the minimum displacement volume of the HST motor 42 is limited to Qmin1.

Next, when the operator operates the lift arm operation lever 210 in the direction of moving up the lift arm 21 (start of lifting operation), by the control of the controller 5, the maximum engine rotational speed rapidly increases from Nmax1 to Nmax2, and the minimum displacement volume of the HST motor 42 rapidly increases from Qmin1 to Qmin2. As a result, the discharge flow rate of the object handling hydraulic pump 43 rapidly increases to a predetermined discharge flow rate and the lifting operation speed of the lift arm 21 increases in proportion to the time, and the maximum vehicle speed is limited (deceleration) from Vmaxl to Vmax2.

When the operator returns the lift arm operation lever 210 to the neutral position to stop the lifting operation of the lift arm 21 (stop of lifting operation), by the control of the controller 5, the maximum engine rotational speed is lowered from Nmax2 to Nmax1 and the minimum displacement volume of the HST motor 42 is returned from Qmin2 to Qmin1. Thereby, the discharge flow rate of the object handling hydraulic pump 43 decreases to the discharge flow rate prior to the lifting operation of the lift arm 21, and as a result, the lifting operation of the lift arm 21 is stopped in a state in which the lift arm 21 is moved to the top, and the maximum vehicle speed is returned to Vmaxl from Vmax2.

As described above, in the present embodiment, when the operator stops the lifting operation of the lift arm 21, the maximum engine rotational speed is immediately returned to the maximum engine rotational speed Nmax1 during traveling on the flat ground, and the maximum vehicle speed is returned to the maximum vehicle speed Vmax1 prior to the lifting operation of the lift arm 21. In this way, the increase of the maximum engine rotational speed and the limitation of the vehicle speed by the controller 5 is released.

If the controller 5 continues to increase the maximum engine rotational speed and limit the vehicle speed when the operator stops the lifting operation of the lift arm 21, the engine 3 is rotated in a state in which the maximum engine rotational speed is Nmax2 which is greater than Nmax1, which makes the vehicle speed instantaneously high. However, as in the present embodiment, by immediately releasing the limitation by the controller 5 when the operator stops the lifting operation of the lift arm 21, it is possible to avoid a problem that the vehicle speed becomes high instantaneously.

(Modification)

Figure 16:
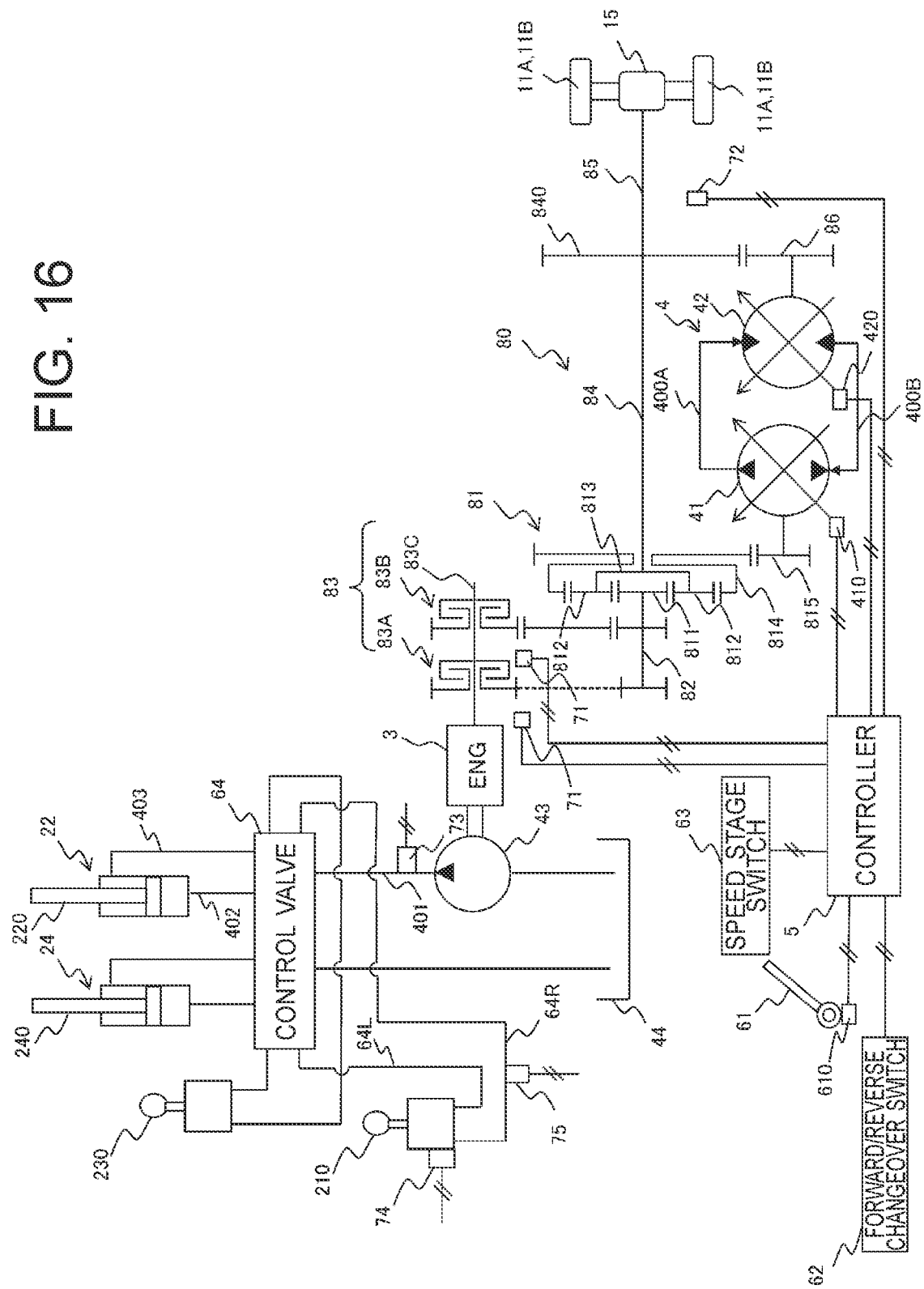
FIG. 16 illustrates a hydraulic circuit and an electric circuit of a wheel loader according to a modification.

Next, a modification of the wheel loader 1 according to the first embodiment of the present invention will be described with reference to FIG. 16. In FIG. 16, the constituent elements common with those described for the wheel loader 1 according to the first embodiment are provided with the same reference signs, and description thereof is omitted.

FIG. 16 illustrates a hydraulic circuit and an electric circuit of the wheel loader 1 according to the present modification.

The wheel loader 1 according to the present modification is configured to control the traveling of the vehicle body by an HMT traveling drive system. An HMT traveling drive device includes an HST 4 in which the HST pump 41 and the HST motor 42 are connected in the shape of a closed circuit via a pair of conduits 400A and 400B, and a mechanical transmission unit 80. The driving force of the engine 3 is transmitted in parallel to the HST 4 and the mechanical transmission unit 80 via a planetary gear mechanism 81.

The planetary gear mechanism 81 includes a sun gear 811 fixed on an input shaft 82, a plurality of planetary gears 812 engaged with the outer periphery of the sun gear 811, a planetary carrier 813 pivotally supporting the plurality of planetary gears 812, a ring gear 814 engaged with the outer periphery of each of the planetary gears 812, and a pump input gear 815 engaged with the outer periphery of the ring gear 814.

The output torque of the engine 3 is transmitted to the input shaft 82 via a clutch device 83 including a hydraulic clutch 83A for forward direction movement, a hydraulic clutch 83B for reverse direction movement, and a clutch shaft 83C, and then transmitted from the input shaft 82 to the planetary gear mechanism 81.

Here, the planetary carrier 813 of the planetary gear mechanism 81 is fixed on an output shaft 84, and accordingly, the driving force of the engine 3 is transmitted to the mechanical transmission unit 80. The driving force of the engine 3 transmitted to the mechanical transmission unit 80 is then transmitted to the axle 15 via a propeller shaft 85 connected to the output shaft 84, which drives the front wheels 11A and the rear wheels 11B.

A pump input gear 815 of the planetary gear mechanism 81 is fixed on a rotation shaft of the HST pump 41, and accordingly, the driving force of the engine 3 is also transmitted to the HST 4. A motor output gear 86 is fixed on a rotation shaft of the HST motor 42 and engages with a gear 840 of an output shaft 84. With this configuration, the driving force of the engine 3 transmitted to the HST 4 is also transmitted to the axle 15 via the propeller shaft 85 connected to the output shaft 84, which drives the front wheels 11A and the rear wheels 11B.

As described above, the transmission is configured by combining the HST 4 and the mechanical transmission unit 80, and accordingly, it is possible to improve the transmission efficiency as compared with the HST traveling drive system described in the first embodiment. FIG. 16 illustrates an input division type HMT traveling drive system for inputting the output from the planetary gear mechanism 81 to the HST 4, meanwhile, the present invention is not limited to this, but may employ an output division type HMT traveling drive system for inputting the output from the HST 4 to the planetary gear mechanism 81.

In the present modification, similarly to the first embodiment, when the specific condition is satisfied, the controller 5 rapidly increases the maximum engine rotational speed from Nmax1 to Nmax2 to quickly move the lift arm 21 in the upward direction, and rapidly increases the minimum displacement volume of the HST motor 42 from Qmin1 to Qmin2 so as to limit the vehicle speed. Thereby, the same operation and effects as those described in the first embodiment can be obtained.

Second Embodiment

Figure 17:
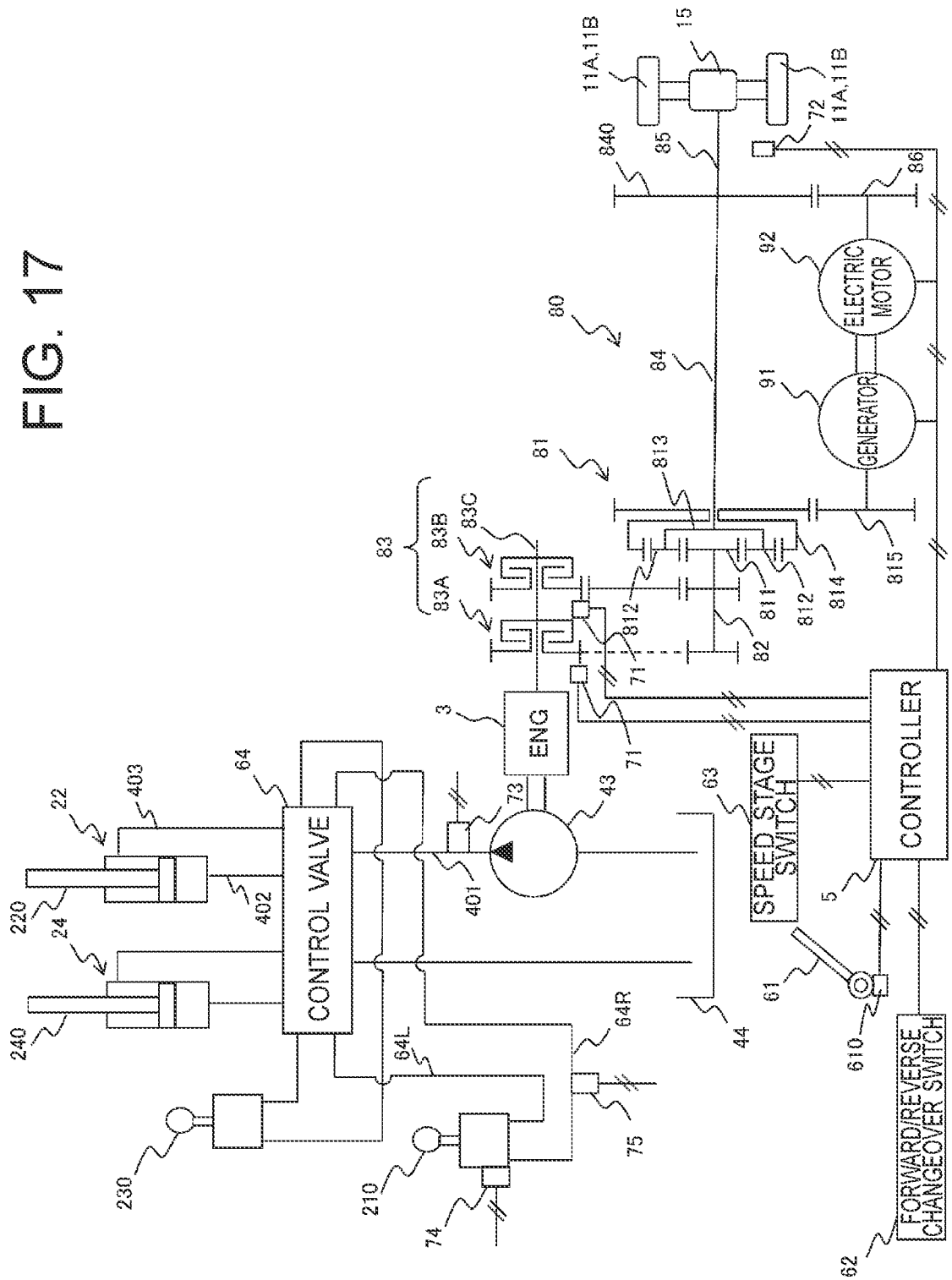
FIG. 17 illustrates a hydraulic circuit and an electric circuit of a wheel loader according to a second embodiment.

Hereinafter, the wheel loader 1 according to the second embodiment will be described with reference to FIG. 17. In FIG. 17, the constituent elements common with those described for the wheel loader 1 according to the first embodiment and the modification are provided with the same reference signs, and description thereof is omitted.

FIG. 17 illustrates a hydraulic circuit and an electric circuit of the wheel loader 1 according to the second embodiment.

The wheel loader 1 according to the present embodiment is configured to control the traveling of the vehicle body by an EMT traveling drive system. In an EMT traveling drive device, a generator 91 and an electric motor 92 are provided respectively instead of the HST pump 41 and the HST motor 42 of the above-described HMT traveling drive device.

In the present embodiment, when the specific condition is satisfied, the controller 5 rapidly decreases the rotational speed of the electric motor 92 to predetermined rotational speed to limit the vehicle speed. The rotational speed of the electric motor 92 is adjusted by changing a current value or a voltage value to the electric motor 92.

Specifically, in a step corresponding to step S507 in FIG. 10, the second calculation section 53B calculates a current value or a voltage value to the electric motor 92 such that the rotational speed of the electric motor 92 becomes the rotational speed N2 (=N1−Ndown) which is smaller than the rotational speed N1 prior to the lifting operation of the lift arm 21 by the predetermined decrease Ndown.

That is, the controller 5 limits the rotational speed of the electric motor 92 so as to establish the relationship similar to the relationship illustrated in FIG. 11(b) between the discharge pressure of the object handling hydraulic pump 43 and the decrease in the rotational speed of the electric motor 92. Thereby, the same operation and effects as those described in the first embodiment can be obtained.

The embodiments and the modification of the present invention have been described above, meanwhile, the present invention is not limited to them but various other modifications are included. For example, the above-described embodiments have been explained in detail in order to clarify the present invention, but are not necessarily limited to those having all the configurations described. In addition, a part of the configuration of the present embodiment can be replaced with that of another embodiment, and the configuration of another embodiment can be added to the configuration of the present embodiment. Furthermore, it is possible to add, delete, or replace another configuration with respect to a part of the configuration of the present embodiment.

For example, although the wheel loader has been described as one aspect of the loading vehicle in each of the embodiments and the modification, the present invention is not limited to this, but can be applied to any work vehicle including an object handling device such as a forklift.

Furthermore, in each of the embodiments and the modification described above, a fixed displacement hydraulic pump is used as the object handling hydraulic pump 43. Meanwhile, the present invention is not limited to this, but a variable displacement hydraulic pump may be used therefor.

REFERENCE SIGNS LIST

1: wheel loader (object handling work vehicle)
2: object handling device
3: engine
5: controller
11A: front wheel
11B: rear wheel
41: HST pump (traveling hydraulic pump)
42: HST motor (traveling hydraulic motor)
43: object handling hydraulic pump
62: forward/reverse changeover switch (traveling state sensor)
73: discharge pressure sensor (operation state sensor)
74: operation amount sensor (operation state sensor)
75: pilot pressure sensor (operation state sensor)
91: generator
92: electric motor
100B: dump truck (loading destination)
210: lift arm operation lever (operation device)
610: step-on amount sensor (traveling state sensor)

The invention claimed is:

1. A loading vehicle, comprising:
an engine;
a variable displacement traveling hydraulic pump driven by the engine;
a variable displacement traveling hydraulic motor connected to the traveling hydraulic pump through a closed circuit to transmit driving force of the engine to wheels;
an object handling device provided at a front portion of a vehicle body to be rotatable in a vertical direction;
an object handling hydraulic pump driven by the engine to supply hydraulic oil to the object handling device; and
an operation device for operating the object handling device, wherein
the loading vehicle further comprises:
a traveling state sensor configured to detect a traveling state of the vehicle body;
an operation state sensor configured to detect an operation state of the object handling device by the operation device; and
a controller configured to control the engine, the traveling hydraulic pump, and the traveling hydraulic motor, and
the controller is configured to:
based on the traveling state detected by the traveling state sensor and the operation state of the object handling device detected by the operation state sensor, determine whether a specific condition for specifying lifting operation of the object handling device during forward traveling of the vehicle body is satisfied, and
in a case of having determined that the specific condition is satisfied, increase maximum rotational speed of the engine to a predetermined value which is greater than the maximum rotational speed of the engine during traveling of the vehicle body on a flat ground with the object handling device being in a non-operating state, and adjust displacement volume of the traveling hydraulic pump or displacement volume of the traveling hydraulic motor so as to limit maximum vehicle speed of the vehicle body to a predetermined value which is smaller than the maximum vehicle speed of the vehicle body prior to the lifting operation of the object handling device.

2. The loading vehicle according to claim 1, wherein the operation state sensor is at least one of an operation signal sensor configured to detect an operation signal from the operation device, an operation amount sensor configured to detect an operation amount of the operation device, and a discharge pressure sensor configured to detect discharge pressure of the object handling hydraulic pump.

3. The loading vehicle according to claim 1, wherein the controller is configured to increase minimum displacement volume of the traveling hydraulic motor so as to limit the maximum vehicle speed of the vehicle body.

4. The loading vehicle according to claim 1, wherein the controller is configured to increase the maximum rotational speed of the engine and limit the maximum vehicle speed of the vehicle body only at a low speed stage which is selected in a case where the vehicle body is traveling toward a loading destination during loading work.

5. The loading vehicle according to claim 1, wherein the controller is configured to:
based on the operation state of the object handling device detected by the operation state sensor, determine whether the lifting operation of the object handling device is stopped; and
in a case of having determined that the lifting operation of the object handling device is stopped, return the increased maximum rotational speed of the engine to the maximum rotational speed of the engine during traveling of the vehicle body on a flat ground with the object handling device being in a non-operating state, and return the limited maximum vehicle speed of the vehicle body to the maximum vehicle speed of the vehicle body prior to the lifting operation of the object handling device.

6. A loading vehicle, comprising:
an engine;
a generator driven by the engine;
an electric motor connected to the generator to transmit driving force of the engine to wheels;
an object handling device provided at a front portion of a vehicle body to be rotatable in a vertical direction;
an object handling hydraulic pump driven by the engine to supply hydraulic oil to the object handling device; and an operation device for operating the object handling device, wherein the loading vehicle further comprises:
- a traveling state sensor configured to detect a traveling state of the vehicle body;
- an operation state sensor configured to detect an operation state of the object handling device by the operation device; and
- a controller configured to control the engine and the electric motor, and the controller is configured to:

based on the traveling state detected by the traveling state sensor and the operation state of the object handling device detected by the operation state sensor, determine whether a specific condition for specifying lifting operation of the object handling device during forward traveling of the vehicle body is satisfied, and in a case of having determined that the specific condition is satisfied, increase maximum rotational speed of the engine to a predetermined value which is greater than the maximum rotational speed of the engine during traveling of the vehicle body on a flat ground with the object handling device being in a non-operating state, and decrease rotational speed of the electric motor so as to limit maximum vehicle speed of the vehicle body to a predetermined value which is smaller than the maximum vehicle speed of the vehicle body prior to the lifting operation of the object handling device.

* * * * *